US012724236B2

(12) United States Patent
Kwon

(10) Patent No.: US 12,724,236 B2
(45) Date of Patent: Sep. 1, 2026

(54) OPTICAL SYSTEM

(71) Applicant: LG INNOTEK CO., LTD., Seoul (KR)

(72) Inventor: Duk Keun Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 374 days.

(21) Appl. No.: 18/269,223

(22) PCT Filed: Dec. 22, 2021

(86) PCT No.: PCT/KR2021/019635
§ 371 (c)(1),
(2) Date: Jun. 22, 2023

(87) PCT Pub. No.: WO2022/139472
PCT Pub. Date: Jun. 30, 2022

(65) Prior Publication Data

US 2024/0085673 A1 Mar. 14, 2024

(30) Foreign Application Priority Data

Dec. 22, 2020 (KR) ........................ 10-2020-0180561

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ............... G02B 13/0045; G02B 13/18; G02B 13/0055; G02B 13/16; G02B 13/0015;
(Continued)

(56) References Cited

U.S. PATENT DOCUMENTS 9,835,822 B2 12/2017 Huang
11,340,429 B2 5/2022 Son et al.
(Continued)

FOREIGN PATENT DOCUMENTS

CN 109343203 A 2/2019
CN 209514189 U 10/2019
(Continued)

OTHER PUBLICATIONS

CN111929850 and Translation (Year: 2020).*
(Continued)

*Primary Examiner* — Travis S Fissel
(74) *Attorney, Agent, or Firm* — SALIWANCHIK, LLOYD & EISENSCHENK

(57) ABSTRACT

An optical system disclosed to an embodiment of the invention includes a first lens, a second lens, a third lens, a fourth lens, a fifth lens, a sixth lens, a seventh lens, and an eighth lens sequentially arranged along an optical axis from an object side to an image side, wherein the first lens has a positive refractive power and has a convex object-side surface, the second lens has a negative refractive power and has a concave image-side surface, and at least one of an object-side surface and an image-side surface of the sixth lens has an inflection point, the seventh lens has a positive refractive power and has a convex image-side surface, the eighth lens has a negative refractive power and has an object-side surface and an image-side surface which have at least one inflection point, a center thickness of the seventh lens may be the thickest among thicknesses of centers of the first to eighth lenses.

11 Claims, 14 Drawing Sheets

(58) Field of Classification Search
CPC .......... G02B 9/62; G02B 9/64; G02B 3/0087; G02B 5/20; G02B 30/00; G02B 2003/0093; G02B 27/0172; G02B 27/0012; G02B 27/0025; G02B 15/146; H04N 5/2254; H04N 5/222
USPC ......... 359/708, 656–658, 713, 749, 756–762
See application file for complete search history.

(56) References Cited

U.S. PATENT DOCUMENTS

| | | | |
|---|---|---|---|
| 11,487,087 | B2 | 11/2022 | Ma |
| 11,493,736 | B2 | 11/2022 | Lyu et al. |
| 11,573,405 | B2 | 2/2023 | Li et al. |
| 11,867,885 | B2 | 1/2024 | Son et al. |
| 11,966,019 | B2 | 4/2024 | Zhu |
| 12,055,681 | B2 | 8/2024 | Ji et al. |
| 12,072,469 | B2 | 8/2024 | Huang |
| 12,105,256 | B2 | 10/2024 | Zhao |
| 12,140,738 | B2 | 11/2024 | Son et al. |
| 12,416,792 | B2 | 9/2025 | Huang |
| 2018/0074299 | A1 | 3/2018 | Huang |
| 2018/0180856 | A1 | 6/2018 | Jung et al. |
| 2019/0227282 | A1 | 7/2019 | Son et al. |
| 2019/0391365 | A1 | 12/2019 | Son et al. |
| 2020/0026041 | A1 | 1/2020 | Teraoka |
| 2020/0233186 | A1 | 7/2020 | Lyu et al. |
| 2021/0181477 | A1 | 6/2021 | Guo |
| 2021/0181480 | A1 | 6/2021 | Ma |
| 2022/0066148 | A1 | 3/2022 | Zhao |
| 2022/0099931 | A1 | 3/2022 | Zhu |
| 2022/0244506 | A1 | 8/2022 | Son et al. |
| 2024/0094512 | A1 | 3/2024 | Son et al. |
| 2025/0013017 | A1 | 1/2025 | Son et al. |
| 2025/0370227 | A1 | 12/2025 | Huang |

FOREIGN PATENT DOCUMENTS

| | | | | | |
|---|---|---|---|---|---|
| CN | 110412749 | A | | 11/2019 | |
| CN | 110554485 | A | | 12/2019 | |
| CN | 110967811 | A | | 4/2020 | |
| CN | 111061038 | A | | 4/2020 | |
| CN | 111077649 | A | | 4/2020 | |
| CN | 210924082 | U | | 7/2020 | |
| CN | 111812811 | A | | 10/2020 | |
| CN | 111929850 | A | * | 11/2020 | ............. G02B 13/02 |
| JP | 2020-13081 | A | | 1/2020 | |
| JP | 2022-56294 | A | | 4/2022 | |
| KR | 10-2018-0076742 | A | | 7/2018 | |
| KR | 10-2020-0001452 | A | | 1/2020 | |
| KR | 10-2020-0083121 | A | | 7/2020 | |
| TW | 202008024 | A | | 2/2020 | |
| WO | 2019/196572 | A1 | | 10/2019 | |

OTHER PUBLICATIONS

International Search Report dated Apr. 20, 2022 in International Application No. PCT/KR2021/019635.

Office Action dated Jan. 19, 2026 in Korean Application No. 10-2020-0180561.

Office Action dated Oct. 21, 2025 in Taiwanese Application No. 110148238.

Office Action dated Feb. 17, 2026 in Japanese Application No. 2023-538104.

Office Action dated Mar. 31, 2026 in Chinese Application No. 202180091803.

Office Action dated Apr. 28, 2026 in European Application No. 21911539.1.

* cited by examiner

OPTICAL SYSTEM

CROSS-REFERENCE TO RELATED APPLICATIONS

This application is the U.S. national stage application of International Patent Application No. PCT/KR2021/019635, filed Dec. 22, 2021, which claims the benefit under 35 U.S.C. § 119 of Korean Application No. 10-2020-0180561, filed Dec. 22, 2020, the disclosures of each of which are incorporated herein by reference in their entirety.

TECHNICAL FIELD

The embodiment relates to an optical system for high resolution.

BACKGROUND ART

The camera module captures an object and stores it as an image or video, and is installed in various applications. In particular, the camera module is produced in a very small size and is applied to not only portable devices such as smartphones, tablet PCs, and laptops, but also drones and vehicles to provide various functions. For example, the optical system of the camera module may include an imaging lens for forming an image, and an image sensor for converting the formed image into an electrical signal. In this case, the camera module may perform an autofocus (AF) function of aligning the focal lengths of the lenses by automatically adjusting the distance between the image sensor and the imaging lens, and may perform a zooning function of zooming up or zooning out by increasing or decreasing the magnification of a remote object through a zoom lens. In addition, the camera module employs an image stabilization (IS) technology to correct or inhibit image stabilization due to an unstable fixing device or a camera movement caused by a user's movement.

The most important element for this camera module to obtain an image is an imaging lens that forms an image. Recently, interest in high performance such as high image quality and high resolution is increasing, and research on an optical system including 5 or 6 lenses is being conducted in order to realize this. For example, research using a plurality of imaging lenses having positive (+) and/or negative (−) refractive power to implement a high-performance optical system is being conducted. However, when arranging a plurality of lenses, there is a problem in that it is difficult to derive excellent optical properties and aberration properties. Therefore, a new optical system capable of solving the above-described problem is required.

DISCLOSURE

Technical Problem

An embodiment of the invention is to provide an optical system with improved optical properties. An embodiment of the invention is to provide a wide-angle optical system having at least 8 lenses. An embodiment of the invention is to provide an optical system in which at least two lenses having positive (+) refractive power and at least two lenses having negative (−) refractive power are aligned with respect to an optical axis among at least 8 lenses.

Technical Solution

An optical system according to an embodiment of the invention includes a first lens, a second lens, a third lens, a fourth lens, a fifth lens, a sixth lens, a seventh lens, and an eighth lens, wherein the first lens has a positive refractive power and has a convex object-side surface, the second lens has a negative refractive power and has a concave image-side surface, and at least one of the surfaces of an object-side surface and an image-side surface of the sixth lens has an inflection point, the seventh lens has a positive refractive power and has a convex image-side surface, the eighth lens has a negative refractive power, and has an object-side surface and an image-side surface having at least one inflection point, and a thickness of a center of the seventh lens among thicknesses of centers of the first to eighth lenses may be the thickest.

According to an embodiment of the invention, the center thickness of the first lens may be thicker than the center thickness of each of the second to sixth lenses and the eighth lens. A refractive index of the second lens may be greater than that of the first and third to eighth lenses. According to an embodiment of the invention, an Abbe number of the first, third, fifth, seventh, and eighth lenses may be 50 or more, and the Abbe number of the second lens may be less than 30. According to an embodiment of the invention, at least one of the third to sixth lenses may have positive or negative refractive power.

According to an embodiment of the invention, an image sensor on an image-side surface of the eighth lens; and an optical filter between the image sensor and the eighth lens, wherein the optical system satisfies Equations 1 and 2:

$$0<BFL/TTL<0.3 \quad \text{[Equation 1]}$$

$$0<BFL/Img<0.3 \quad \text{[Equation 2]}$$

Wherein BFL is a distance from an apex of the image-side surface of the eighth lens to the image sensor, TTL is a distance from an apex of an object-side first surface of the first lens to the image sensor, and Img may be a vertical distance from the optical axis to 1° F., which is a diagonal end on the image sensor.

According to an embodiment of the invention, an image sensor on the image-side surface of the eighth lens and an optical filter between the image sensor and the eighth lens are included, and the optical system satisfies Equations 3, 4 and 5:

$$0.5<F/TTL<1.2 \quad \text{[Equation 3]}$$

$$0.5<TTL/(Img\times 2)<0.8 \quad \text{[Equation 4]}$$

$$0.5<TTL/(D82\times 2)<1.2 \quad \text{[Equation 5]}$$

TTL is the distance from an apex of the object-side first surface of the first lens to the image sensor, F is a total effective focal length of the optical system, and Img is a vertical distance from the optical axis to 1.0 F, which is a diagonal end on the image sensor, D82 may be a distance from an apex of the image-side surface of the eighth lens to the effective diameter with respect to the optical axis.

According to an embodiment of the invention, wherein a radius of curvature of the object-side surface of the first lens is L1R1 and an absolute value of the radius of curvature of the image-side surface of the first lens is defined as |L1R2|, and the following relation may be satisfied: $0<L1R1/|L1R2|<1$. According to an embodiment of the invention, wherein an absolute value of the radius of curvature of the object-side surface of the second lens is |L2R1| and a radius of curvature of the image-side surface of the second lens is L2R2, the following relation may be satisfied: $0<L2R2/|L2R1|<1$.

According to an embodiment of the invention, at 587 nm, wherein a refractive index of the first lens is G1, a refractive index of the second lens is G2, and refractive indices of the sixth and seventh lenses are G6 and G7, and the following relation may be satisfied: $0.8<G1/G2<1.2$ and $0.8<G7/G6<1.2$. When the thicknesses of the centers of the first, second, sixth, and seventh lenses are T1, T2, T6, and T7, and the following relation may be satisfied: $0.1<T2/T1<0.8$ and $0.1<T6/T7<1$.

According to an embodiment of the invention, a first interval between the second lens and the third lens along the optical axis is smaller than a second interval between the sixth lens and the seventh lens, and an interval between the seventh lens and the eighth lens along the optical axis may be smaller than the first and second intervals. The first interval and the second interval may be 0.4 mm or more. According to an embodiment of the invention, the thickness of the center of the seventh lens may be in the range of 2 to 4 times the thickness of each of the centers of the fourth, fifth, and sixth lenses.

An optical system according to an embodiment of the invention includes a first lens, a second lens, a third lens, a fourth lens, a fifth lens, a sixth lens, a seventh lens, and an eighth lens, wherein the first lens has a positive refractive power and has a convex object-side surface, the second lens has a negative refractive power and has a concave image-side surface, and at least one of an object-side surface and an image-side surface of the sixth lens has an inflection point, the seventh lens has a positive refractive power and has a convex image-side surface, the eighth lens has a negative refractive power and has an object-side surface and an image-side surface having at least one inflection point, wherein five or more among the first to eighth lenses are lenses having a convex object-side surface, two or more among the first to eighth lenses are lenses having a concave object-side surface, three or more among the first to eighth lenses are lenses having a convex image-side surface, and five or more are lenses having a concave image-side surface.

According to an embodiment of the invention, wherein a number of lenses having an Abbe number of 50 or more may be 5 or more, and a number of lenses having an Abbe number of less than 50 may be 3 or less, among the first to eighth lenses. Wherein there may be one or more lenses having a refractive index of 1.6 or more at 587 nm and seven or less having a refractive index of less than 1.6, among the first to eighth lenses. Wherein the number of lenses having a center thickness of 0.6 mm or more is three or more, and the number of lenses having a center thickness of less than 0.6 mm may be five or less, and the center thickness of the seventh lens may be the thickest, among the first to eighth lenses.

Advantageous Effects

The optical system according to the embodiment may correct aberration characteristics and implement a slim optical system. Accordingly, the optical system can be miniaturized and high quality and high resolution can be realized. The optical system according to the embodiment may block unnecessary light entering the optical system. Accordingly, it is possible to improve the performance of the optical system by reducing aberration.

BEST MODE

Figure 1:
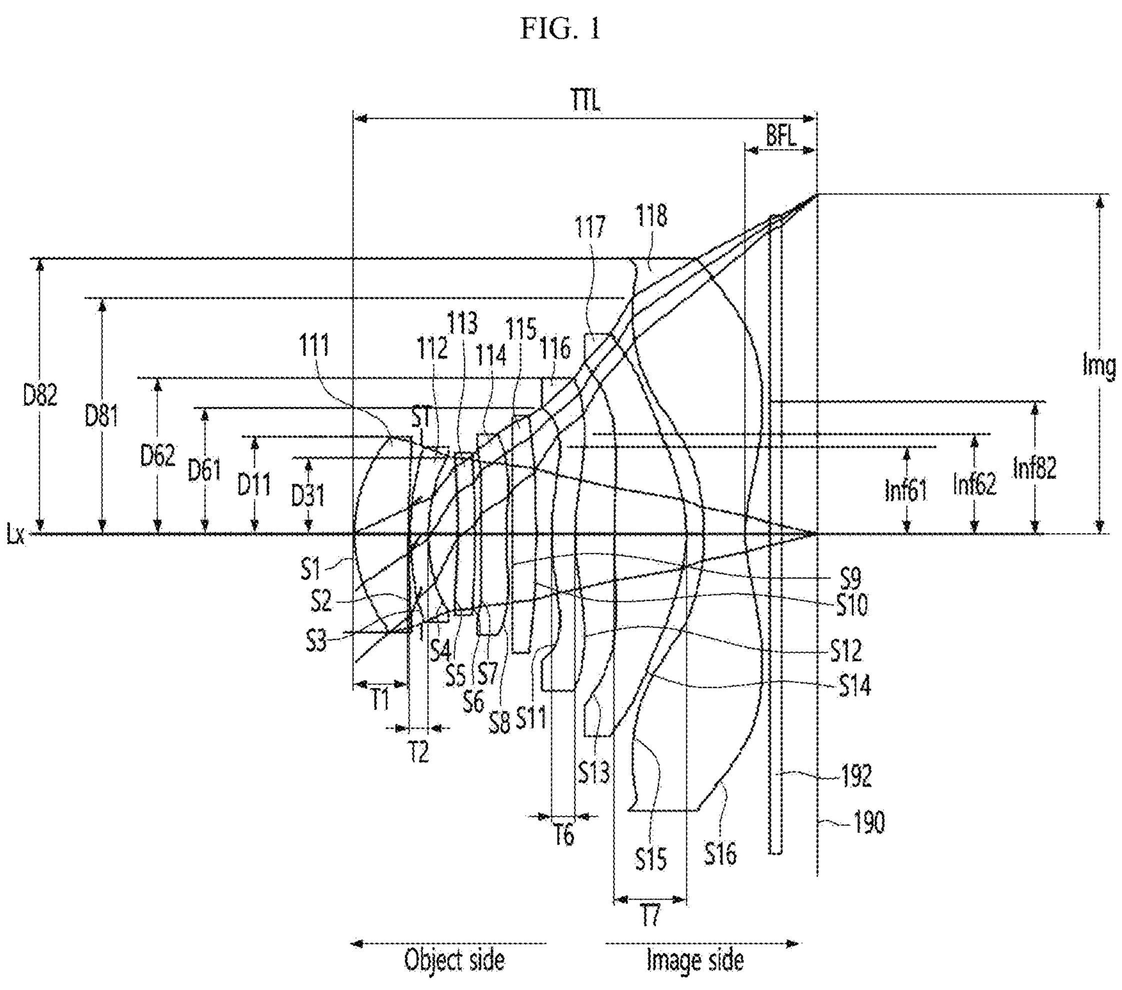
FIG. 1 is a block diagram of an optical system according to a first embodiment of the invention.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used.

Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

In the description of the invention, the first lens means the lens closest to the object side among the plurality of lenses aligned with the optical axis, and the last lens means the lens closest to the image side (or sensor side) among the plurality of lenses aligned with the optical axis. In the description of the invention, all measures for the radius, effective diameter, thickness, distance, BFL (Back Focal Length), TTL (Total Track Length or Total Top Length), etc. of the lens are mm unless otherwise specified. In the present specification, the shape of the lens is shown based on the optical axis of the lens. For example, that the object-side or sensor-side surface of the lens is convex means that the optical axis vicinity is convex on the object-side or sensor-side surface of the lens, but does not mean that the optical axis periphery is convex. Accordingly, even when the object-side or sensor-side surface of the lens is described as being convex, the portion around the optical axis on the object-side or sensor-side surface of the lens may be concave. That the object-side or sensor-side surface of the lens is concave means that the vicinity of the optical axis is concave on the object-side or sensor-side surface of the lens, but does not mean that the periphery of the optical axis is concave. Accordingly, even when the object-side or sensor-side surface of the lens is described as being concave, the portion around the optical axis on the object-side or sensor-side surface of the lens may be convex. In the present specification, it should be noted that the thickness and radius of curvature of the lens are measured based on the optical axis of the lens. In addition, "object-side surface" may mean the surface of the lens facing the object side with respect to the optical axis, and "image side" may mean the surface of the lens facing the imaging surface with respect to the optical axis.

An optical system according to an embodiment of the invention may include a plurality of lenses. In detail, the optical system according to the first to third embodiments may include at least eight lenses. As the resolution progresses, the size of the image sensor also increases, and the number of lenses gradually increases according to the resolution of the image sensor. An embodiment of the invention is to provide a high-resolution optical system using at least 8 lenses.

Figure 2:
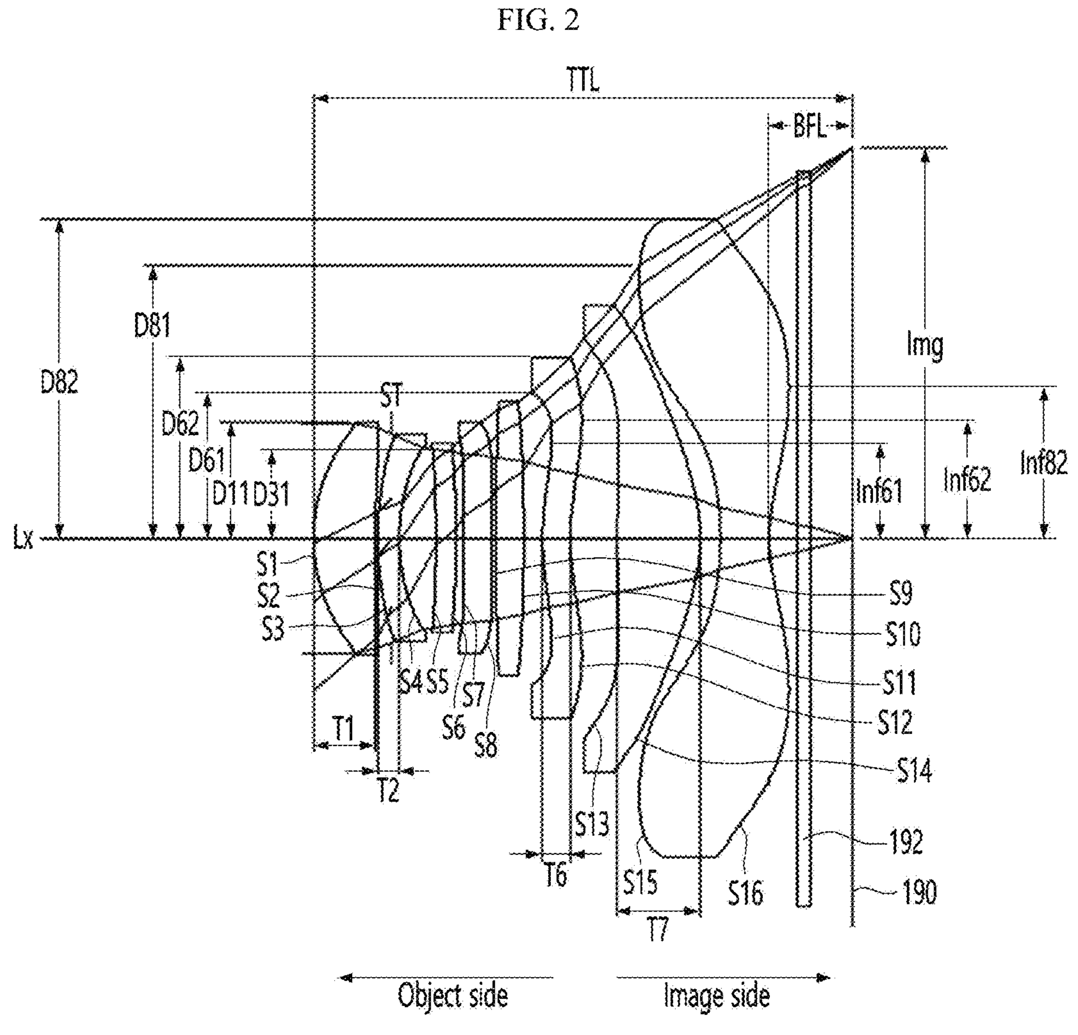
FIG. 2 is a block diagram of an optical system according to a second embodiment of the invention.
Figure 3:
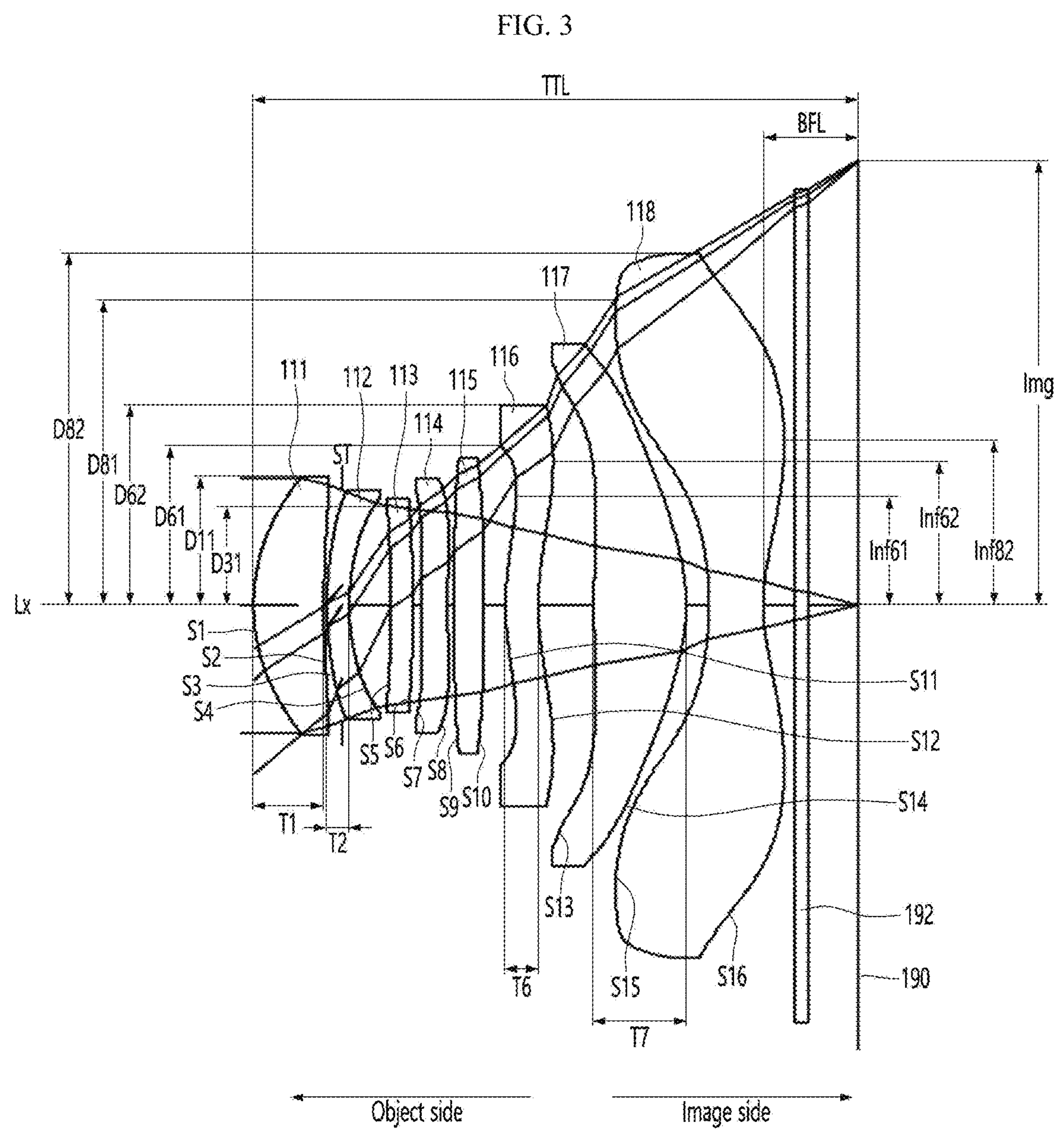
FIG. 3 is a block diagram of an optical system according to a third embodiment of the invention.

Referring to FIGS. 1 to 3, the optical systems of the first to third embodiments may include, for example, a first lens 111, a second lens 112, and a third lens 113, a fourth lens 114, a fifth lens 115, a sixth lens 116, a seventh lens 117, and an eighth lens 118 sequentially arranged from the object side to the image side. The optical system may include an optical filter 192 and an image sensor 190. The optical system having the plurality of lenses 111-118 may be defined as a lens optical system, and the optical system further including the lenses 111-118, the optical filter 192 and the image sensor 190 may be defined as a camera module. The camera module may include a circuit board and at least one lens holder supporting one or two or more lenses, and may have one or plurality of drive member moving one or a plurality of lens holders in an optical axis direction and/or a direction perpendicular to the optical axis.

The first to eighth lenses 111, 112, 113, 114, 115, 116, 117, and 118 may be sequentially disposed along the optical axis Lx of the optical system. The light corresponding to the image information of the object is incident through the first lens 111, the second lens 112, the third lens 113, the fourth lens 114, the fifth lens 115, and the sixth lens 116, the seventh lens 117, and the eighth lens 118, and pass through the optical filter 192 to focus on the image sensor 190 and may be obtained as an electrical signal. Each of the first to eighth lenses 111, 112, 113, 114, 115, 116, 117 and 118 may include an effective region and an ineffective region. The effective region may be a region through which light incident on each lens passes. That is, the effective region may be a region in which incident light is refracted to realize optical properties. The ineffective region may be disposed around the effective region. The ineffective region may be a region to which the light is not incident. That is, the ineffective region may be a region independent of optical characteristics of the optical system. In addition, the ineffective region may be a region fixed to a barrel (not shown) for accommodating the lens, or a region in which light is blocked by a light blocking unit or a spacer.

At least one or two or more of the first to eighth lenses 111, 112, 113, 114, 115, 116, 117, and 118, or at least one or two or more of the fifth to eighth lenses 115, 116, 117, and 118 may have a length smaller than the effective diameter in a first direction and a second direction orthogonal to the optical axis Lx. Such lens(s) may be provided in a non-circular shape having a diameter in the second direction and a distance smaller than the diameter in the first direction.

The optical system according to FIGS. 1 to 3 may include an aperture stop ST for adjusting the amount of incident light. The aperture stop ST may be disposed between two lenses selected from among the first to eighth lenses 111, 112, 113, 114, 115, 116, 117 and 118. For example, the aperture stop ST may be disposed on the outer periphery between the first lens 111 and the second lens 112 or on the outer periphery between the second lens 112 and the third lens 113. The aperture stop ST may be disposed closer to the image side (or exit surface) of the first lens 111 than to the image side of the second lens 112.

As another example, at least one of the first to eighth lenses 111, 112, 113, 114, 115, 116, 117 and 118 may serve as an aperture stop. For example, a selected one of the lens surfaces of the first to eighth lenses 111, 112, 113, 114, 115, 116, 117 and 118 may serve as an aperture stop for controlling the amount of light. For example, the perimeter of the image-side surface of the first lens 111 or the perimeter of the object-side surface of the second lens 112 may serve as an aperture stop.

Referring to FIGS. 1 to 3, in the optical system, the first lens 111 may have positive (+) refractive power. The first lens 111 may include a plastic material. The first lens 111 may include a first surface S1 defined as an object-side surface and a second surface S2 defined as an image-side surface. The first surface S1 may be convex and the second surface S2 may be concave. That is, the first lens 111 may have a meniscus shape convex toward the object. The second surface S2 may be flat or convex. At least one or both of the first surface S1 and the second surface S2 of the first lens 111 may be aspherical. At least one of the first surface S1 and the second surface S2 may have an inflection point.

The second lens 112 may have negative (−) refractive power. The second lens 112 may include a plastic or glass material. The second lens 112 may include a third surface S3 defined as an object-side surface and a fourth surface S4 defined as an image-side surface. The third surface S3 may be convex and the fourth surface S4 may be concave. At least one of the third surface S3 and the fourth surface S4 may be a spherical surface or an aspherical surface. For example, both the third surface S3 and the fourth surface S4 may be aspherical. The size of the effective diameter of the object-side surface or the image-side surface of the first lens 111 may be larger than the size of the effective diameter of the object-side surface or the image-side surface of the second lens 112 or the third lens 113. Here, the effective diameter may be the diameter of the effective region of the object-side surface or the image-side surface on which light is incident. Here, the center thickness of the first lens 11I may be greater than the center thickness of each of the second and third lenses 112 and 113, for example, in the range of 2 to 4 times. Here, the center thickness of the first lens 111 may be the second largest among the center thicknesses of the lenses of the optical system. The center thickness of the first lens 111 may be greater than the center thickness of each of the fourth to sixth lenses 114, 115, and 116, for example, in the range of 1.5 to 3 times.

The third lens 113 may have positive (+) or negative (−) refractive power. The third lens 113 may include a plastic or glass material. The third lens 113 may include a fifth surface S5 defined as an object-side surface and a sixth surface S6 defined as an image-side surface. The fifth surface S5 may be concave and the sixth surface S6 may be convex. That is, the third lens 114 may have a meniscus shape convex toward the image-side. Alternatively, the fifth surface S5 and/or the sixth surface S6 may be flat. At least one or both of the fifth surface S5 and the sixth surface S6 may be aspherical.

The optical axis interval between the second lens 112 and the third lens 113 may be greater than the optical axis interval between the first and second lenses 111 and 112 and may be greater than the optical axis interval between the third and fourth lenses 113 and 114. The optical axis interval between the second lens 112 and the third lens 113 may be greater than the optical axis interval between the fifth and sixth lenses 115 and 116, maybe smaller than the optical axis interval between the sixth and seventh lenses 116 and 117, and may be greater than the optical axis interval between the seventh and eighth lenses 117 and 118.

The fourth lens 114 may have positive (+) or negative (−) refractive power. The fourth lens 114 may include a plastic or glass material. The fourth lens 114 may include a seventh surface S7 defined as an object-side surface and an eighth surface S8 defined as an image-side surface. The seventh surface S7 may be convex, and the eighth surface S8 may be concave. Alternatively, the seventh surface S7 and/or the eighth surface S8 may be flat. At least one or both of the seventh surface S7 and the eighth surface S8 may be aspherical.

The fifth lens 115 may have positive (+) or negative (−) refractive power. The fifth lens 115 may include a plastic or glass material. The fifth lens 115 may include a ninth surface S9 defined as an object-side surface and a tenth surface S10 defined as an image-side surface. The ninth surface S9 may be convex and the tenth surface S10 may be convex. That is, the fifth lens 115 may have a convex shape on both sides. At least one or both of the ninth surface S9 and the tenth surface S10 may be aspherical. At least one of the ninth surface S9 and the tenth surface S10 may have an inflection point. The radius of curvature at the center of the ninth surface S9 of the fifth lens 115 may be the largest among the radius of curvature of the object-side surface or the image-side surface of the lenses of the optical system, and may be 500 mm or more, and when expressed as an absolute value, a radius of curvature at the center of the tenth surface S10 of the fifth lens 115 may be greater than the radius of curvature of the first surface S1, the third and fourth surfaces S3 and S4, the eleventh surface and twelfth surfaces S1 and S12, and the thirteenth and fourteenth surfaces S13 and S14.

Here, the effective diameters of the third, fourth, and fifth lenses 113, 114, and 115 gradually increase from the object side to the lens in the image direction, for example, the effective diameter of the object side or image side surface of the fourth lens 114 is may be greater than the effective diameter of the object-side surface or the image-side surface of the third lens 113, and may be smaller than the effective diameter of the object-side surface or the image-side surface of the fifth lens 115.

The sixth lens 116 may have positive (+) or negative (−) refractive power. The sixth lens 116 may include a plastic material. The sixth lens 116 may include an eleventh surface S11 defined as an object-side surface and a twelfth surface S12 defined as an image-side surface. On the optical axis, the eleventh surface S11 may be convex and the twelfth surface S12 may be concave. The eleventh surface S11 and the twelfth surface S12 may be aspherical.

At least one or both of the eleventh surface S1 and the twelfth surface S12 may have at least one inflection point. In detail, the eleventh surface S11 may have an inflection point around the center, and the distance inf61 from the optical axis Lx to the inflection point may be disposed at a position of about 40% to about 70%, when the edge of the sixth lens 116 is used as an end point with respect to the optical axis Lx. Here, the distance inf61 of the inflection point on the eleventh surface S1 may be a position set based on the vertical direction of the optical axis Lx. The distance inf62 to the inflection point of the twelfth surface S12 may be disposed closer to the edge than the inflection point position of the eleventh surface S11. That is, the distance inf62>inf61 from the optical axis Lx to the inflection point may be satisfied.

The seventh lens 117 may have positive (+) refractive power. The seventh lens 117 may include a plastic or glass material. The seventh lens 117 may include a thirteenth surface S13 defined as an object-side surface and a fourteenth surface S14 defined as an image-side surface. The thirteenth surface S13 may be convex and the fourteenth surface S14 may be convex. That is, the seventh lens 117 may have a shape that is convex to both sides. At least one or both of the thirteenth surface S13 and the fourteenth surface S14 may be aspherical. At least one of the thirteenth surface S13 and the fourteenth surface S14 may have an inflection point.

A radius of curvature at the center of the thirteenth surface S13 of the seventh lens 117 may be greater than a radius of curvature at the center of the first to sixth surfaces S1, S2, S3, S4, S5, and S6. The radius of curvature at the center of the fourteenth surface S14 of the seventh lens 117 may be smaller than the radius of curvature at the center of the fifteenth surface S15 of the eighth lens 118 when calculated as an absolute value. Here, the effective diameter of the seventh lens 117 on the object side or the image side may be larger than the effective diameter of the first to sixth lenses 111, 112, 113, 114, 115, and 116. The thickness of the center of the seventh lens 117 may be at least twice the thickness of the center of each of the fourth, fifth and sixth lenses 114, 115 and 116, for example, in the range of 2 to 4 times.

The eighth lens 118 may have negative (−) refractive power. The eighth lens 118 may include a plastic material. The eighth lens 118 may include a fifteenth surface S15 defined as an object-side surface and a sixteenth surface S16 defined as an image-side surface. On the optical axis, the fifteenth surface S15 may be concave and the sixteenth surface S16 may be concave. The fifteenth surface S15 and the sixteenth surface S16 may be aspherical. Each of the fifteenth surface S15 and the sixteenth surface S16 may have at least one inflection point. In detail, the sixteenth surface S16 may have a distance Inf82 from the periphery of the center to the inflection point, and the inflection point may be disposed at a position of about 15% to about 60% from the starting point, when the optical axis Lx is used as the starting point and the edge of the eighth lens 118 is used as an endpoint. Here, the position of the inflection point on the sixteenth surface S16 may be located at the distance inf82 with respect to the vertical direction of the optical axis Lx. The distance inf82 from the optical axis to the inflection point of the sixteenth surface S16 may be greater than the distances inf61 and inf62 to the inflection point of the sixth lens 116. Here, a straight line connecting the edges of the object-side surface of the eighth lens 118 may be disposed between the apex of the object-side surface of the seventh lens 117 and the apex of the image-side surface. Accordingly, the light incident from the eighth lens 118 may be refracted further outward with respect to the optical axis.

The optical filter 192 may include at least one of optical filters such as an infrared filter and a cover glass. The optical filter 192 may pass light of a set wavelength band and filter light of a different wavelength band. When the optical filter 192 includes an infrared filter, radiant heat emitted from external light may be blocked from being transmitted to the image sensor. In addition, the optical filter 192 may transmit visible light and reflect infrared light. The image sensor 190 may detect light. The image sensor 190 may include a charge coupled device (CCD) or a complementary metal oxide semiconductor (CMOS).

The TTL of the optical system may be provided in the range of 7 mm or more, for example, 7 mm to 12 mm or 7 mm to 11.5 mm. The TTL is a distance from the apex of the object-side surface of the first lens 111 to the image sensor 190. The distance BFL from the apex of the image-side sixteenth surface S16 of the eighth lens 118 to the image sensor 190 may be 1 mm or more, for example, in a range of 1 mm to 2.2 mm or 1 mm to 1.9 mm. The vertical distance Img from the optical axis of the image sensor 190 to 1.0 field may be in the range of 4 mm or more, for example, 4 mm to 10 mm or 4.5 mm to 8.5 mm. The total focal length F of the optical system may be in the range of 5 mm or more, for example, 5 mm to 10 mm or 6 mm to 9 mm.

In the optical system of the first to third embodiments, all of the first to sixteenth surfaces S1 to S16 of the first to eighth lenses 111, 112, 113, 114, 115, 116, 117 and 118 may be aspherical. Each radius of curvature (changed to an absolute value) of the first to sixteenth surfaces S1 to S16 with respect to the optical axis may be eight or less surfaces having a radius of curvature of 10 mm or less, and may be eight or more surfaces having a radius of curvature of 10 mm or more, among the object-side surface and the image-side surface. Among the first to sixteenth surfaces S1-S16 of the first to eighth lenses 111, 112, 113, 114, 115, 116, 117, and 118, there may be at least five lenses with a convex object-side surface on the optical axis, two or more lenes with a concave object-side surface, three or more lenes with a convex image-side surface, and five or more lenses having a concave image-side surface. Looking at the Abbe numbers of the first to eighth lenses 111, 112, 113, 114, 115, 116, 117 and 118, lenses having an Abbe number of 50 or more may be five or more, and lenses having an Abbe number of less than 50 may be three or less. For example, the Abbe number of the first lens 111, the third lens 113, the fifth lens 115, the seventh lens 117, and the eighth lens 118 is 50 or more, The Abbe number of the second lens 112, the fourth lens 114, and the sixth lens 116 may be 35 or less, and the Abbe number of the second lens 112 may be the smallest among the lenses of the optical system, and may be less than 30.

Looking at the refractive indices of the first to eighth lenses 111, 112, 113, 114, 115, 116, 117, and 118, there may be one or more lenses having a refractive index of 1.6 or more at 587 nm, and seven or less lenses having a refractive index of less than 1.6. For example, the refractive index of the second lens 112 at 587 nm is 1.6 or more, and the first and third lenses 111 and 113, the fourth and fifth lenses 114 and 115, and the seventh and eighth lenses 117 and 118 may be less than 1.6. Looking at the thickness of the center of the first to eighth lenses 111,112,113,114,115,116,117, and 118, the number of lenses having a center thickness of 0.6 mm or more is three or more, and the number of lenses having a center thickness of less than 0.6 mm is five or less. For example, the thicknesses T1, T2, and T3 of the centers of the first to third lenses 11, 112, and 113 may satisfy the condition of T3<T2<T1, and the thicknesses T3, T4, T5, and T6 of the central portions of the third to sixth lenses 113, 114, 115, and 116 may satisfy the condition of T3<T6<T4<T5, the thicknesses of the central portions of the third and fourth lenses 113 and 114 satisfy the relation of T3<T4, and the thicknesses T7 and T8 of the central portions of the seventh lens and eighth lenses 117 and 118 may satisfy a relationship of T8<T1<T7. Here, T1 to T8 are the thicknesses of the respective central portions of the first to eighth lenses 111 to 118.

In the first to eighth lenses 111, 112, 113, 114, 115, 116, 117, and 118, when looking at the interval on the optical axis between two adjacent lenses, T78<T23<T67 is satisfied, the T67 is the optical axis interval between the adjacent sixth and seventh lenses 116 and 117, the T23 is the optical axis interval between the second and third lenses 112 and 113, and the T78 is the optical axis interval between the adjacent seventh and eighth lenses 117 and 118. Here, the T23 is 0.4 mm or more, greater than the optical axis interval between the first and second lenses 111 and 112, the T67 may be thicker than the thickness of the center of the second lens 112, and 0.5 mm or more, for example, in the range of 0.5 mm to 1 mm. Also, looking at the interval between the seventh lens 117 and the eighth lens 118, the optical axis distance between two adjacent apexes on the optical axis may be greater than the interval between the two adjacent adjacent peripheral parts.

Figure 4:
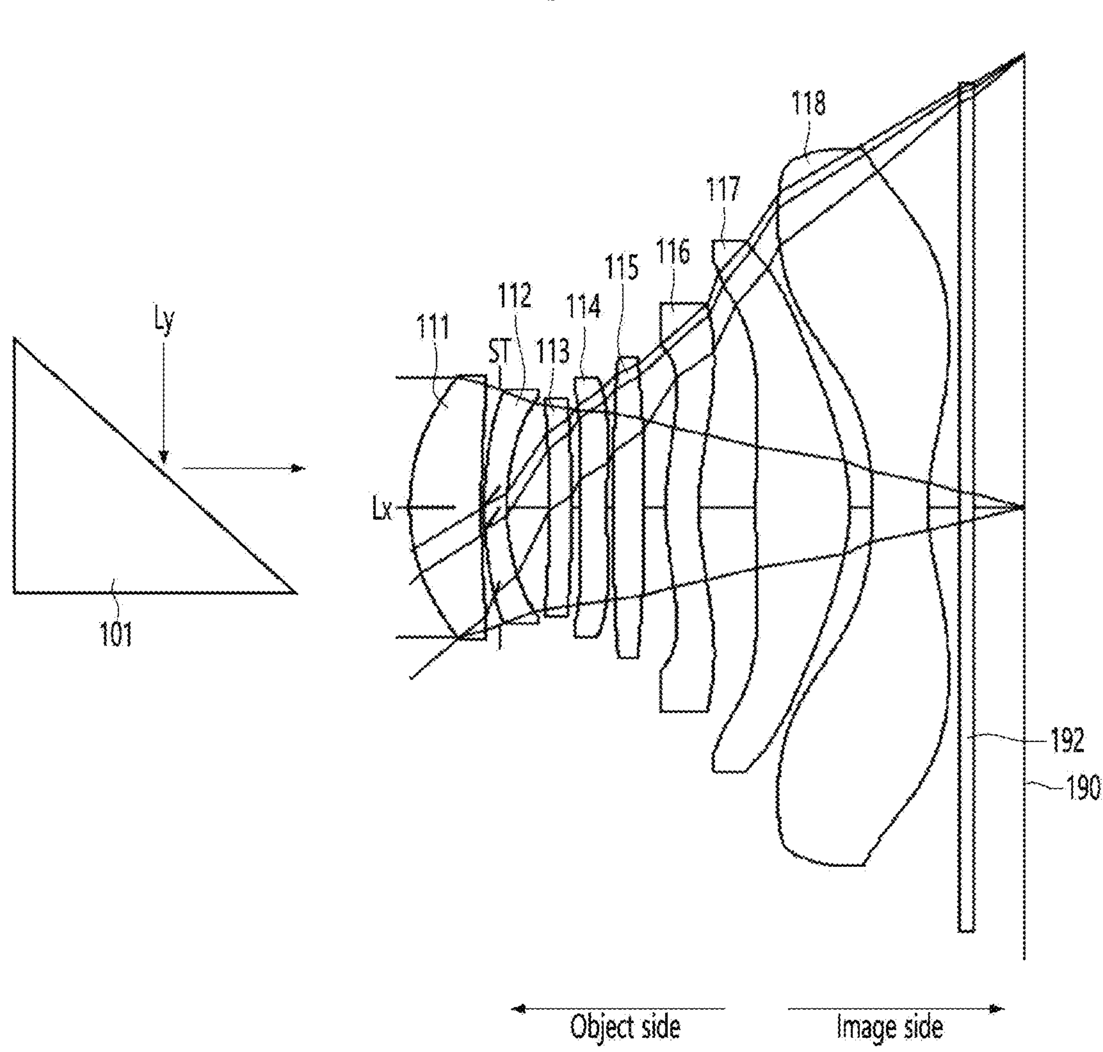
FIG. 4 is an example in which the reflective member is disposed on an incident side of the optical system according to the first to third embodiments of the invention.

As shown in FIG. 4, in the optical system, the reflective member 101 may be disposed on the incident side of the first lens 111. The reflective member 101 may reflect the light incident through the optical axis Ly orthogonal to the optical axis Lx of the first lens 111 to the eighth lens 118, toward the first lens 111. The reflective member 101 may include a prism, that is, a triangular or right-angled prism.

Table 1 shows data showing the radius (mm) of curvature of the surface of each lens, the center thickness (mm) of each lens, the center interval (mm) between adjacent lenses, the refractive index, and the Abbe number of the first embodiment.

TABLE 1

| Lens | Surface | Radius | Thickness/ Interval | Index | Abbe # |
|---|---|---|---|---|---|
| Lens 1 | S1 | 2.633 | 0.949 | 1.5441 | 56.115 |
| | S2 | 13.464 | 0.241 | | |
| Aperture | Stop | Infinity | −0.202 | | |
| Lens 2 | S3 | 4.776 | 0.319 | 1.6714 | 19.238 |
| | S4 | 3.077 | 0.515 | | |
| Lens 3 | S5 | −22.617 | 0.305 | 1.5441 | 56.115 |
| | S6 | −18.532 | 0.106 | | |
| Lens 4 | S7 | 20.604 | 0.464 | 1.588 | 28.269 |
| | S8 | 12.683 | 0.078 | | |
| Lens 5 | S9 | 678.454 | 0.433 | 1.5441 | 56.115 |
| | S10 | −18.906 | 0.279 | | |
| Lens 6 | S11 | 3.881 | 0.406 | 1.588 | 28.269 |
| | S12 | 3.816 | 0.697 | | |
| Lens 7 | S13 | 35.540 | 1.271 | 1.5441 | 56.115 |
| | S14 | −2.413 | 0.309 | | |
| Lens 8 | S15 | −4.541 | 0.730 | 1.5343 | 55.656 |
| | S16 | 2.539 | 0.428 | | |
| Optical filter | S17 | Infinity | 0.210 | 1.5231 | 54.49 |
| | S18 | Infinity | 0.646 | | |

In Table 1, the thickness is the thickness (mm) of the center of each lens, and the interval is the distance (mm) between two adjacent lenses. S17 is an incident side surface of the optical filter, and 518 is an exit surface of the optical filter. Table 2 shows values showing the aspheric coefficients of the surfaces of each lens of FIG. 1.

TABLE 2

| Surface | K | A | B | C | D |
|---|---|---|---|---|---|
| S1 | 0.001124609 | −0.00038766 | 3.15E−03 | −0.00677868 | 0.008119183 |
| S2 | −0.11599151 | −0.0350569 | 0.062719883 | −0.07654012 | 0.065702804 |
| S3 | −0.03123039 | −0.03967789 | 0.057246243 | −0.056176 | 0.038520271 |
| S4 | 0.924016389 | −0.0123375 | 0.003333539 | 0.020810285 | −4.11E−02 |
| S5 | 158.0531369 | 0.001133084 | −0.0019894 | −0.00384081 | 0.01400747 |
| S6 | −28.2354821 | 0.002052102 | −0.0054756 | −0.00435029 | 0.023273005 |
| S7 | 0 | −0.01997905 | 0.011078044 | −0.03075256 | 0.046819974 |
| S8 | 0 | −0.03408939 | 0.038183757 | −0.06474092 | 0.05938933 |
| S9 | 0 | −0.00569004 | 0.041383718 | −7.60E−02 | 0.069499231 |
| S10 | 0 | −0.00665415 | 0.018665207 | −0.02052266 | 0.012126182 |
| S11 | −0.70397081 | −0.04765838 | 0.016674732 | −0.00620285 | 0.000876772 |
| S12 | −1.61593641 | −0.03744648 | 0.007648128 | −0.00023167 | −0.00095759 |
| S13 | −153.16308 | 0.001592706 | −0.00166953 | −0.00137281 | 0.001198558 |
| S14 | −1.11260517 | 0.057615767 | −0.02460601 | 0.006617841 | −0.00106308 |
| S15 | −1.65613898 | 0.001057411 | −0.01109585 | 0.003694549 | −0.00055774 |
| S16 | −9.32240514 | −0.01738217 | 0.003071199 | −0.00044074 | 4.55E−05 |
| S17 | 0 | −0.01997905 | 0.011078044 | −0.03075256 | 0.046819974 |
| S18 | 0 | −0.03408939 | 0.038183757 | −0.06474092 | 0.05938933 |

| Surface | E | F | G | H | J |
|---|---|---|---|---|---|
| S1 | −0.00624135 | 3.02E−03 | −8.99E−04 | 1.49E−04 | −1.06E−05 |
| S2 | −0.03980359 | 0.016462646 | −4.42E−03 | 6.91E−04 | −4.78E−05 |
| S3 | −0.01618216 | 0.003363557 | 4.41E−05 | −1.51E−04 | 1.94E−05 |
| S4 | 0.042209904 | −0.02441477 | 7.71E−03 | −1.11E−03 | 3.54E−05 |
| S5 | −0.01921004 | 1.51E−02 | −6.99E−03 | 1.78E−03 | −1.94E−04 |
| S6 | −0.0341619 | 2.71E−02 | −1.23E−02 | 2.99E−03 | −3.02E−04 |
| S7 | −0.04271581 | 2.36E−02 | −7.72E−03 | 1.36E−03 | −9.86E−05 |
| S8 | −0.03223459 | 0.010439821 | −1.94E−03 | 1.82E−04 | −6.02E−06 |
| S9 | −0.03724546 | 1.22E−02 | −2.42E−03 | 2.66E−04 | −1.25E−05 |
| S10 | −0.00413207 | 0.000791144 | −7.61E−05 | 2.52E−06 | 3.26E−08 |
| S11 | 0.000311413 | −2.07E−04 | 5.26E−05 | −6.86E−06 | 3.69E−07 |
| S12 | 0.000434115 | −9.34E−05 | 1.11E−05 | −6.94E−07 | 1.80E−08 |
| S13 | −0.00043998 | 8.84E−05 | −1.01E−05 | 6.07E−07 | −1.51E−08 |
| S14 | 1.00E−04 | −4.96E−06 | 5.00E−08 | 5.97E−09 | −1.93E−10 |
| S15 | 4.89E−05 | −2.65E−06 | 8.76E−08 | −1.62E−09 | 1.28E−11 |
| S16 | −3.16E−06 | 1.31E−07 | −2.69E−09 | 1.24E−11 | 2.41E−13 |
| S17 | −0.04271581 | 2.36E−02 | −7.72E−03 | 1.36E−03 | −9.86E−05 |
| S18 | −0.03223459 | 0.010439821 | −1.94E−03 | 1.82E−04 | −6.02E−06 |

Figure 5:
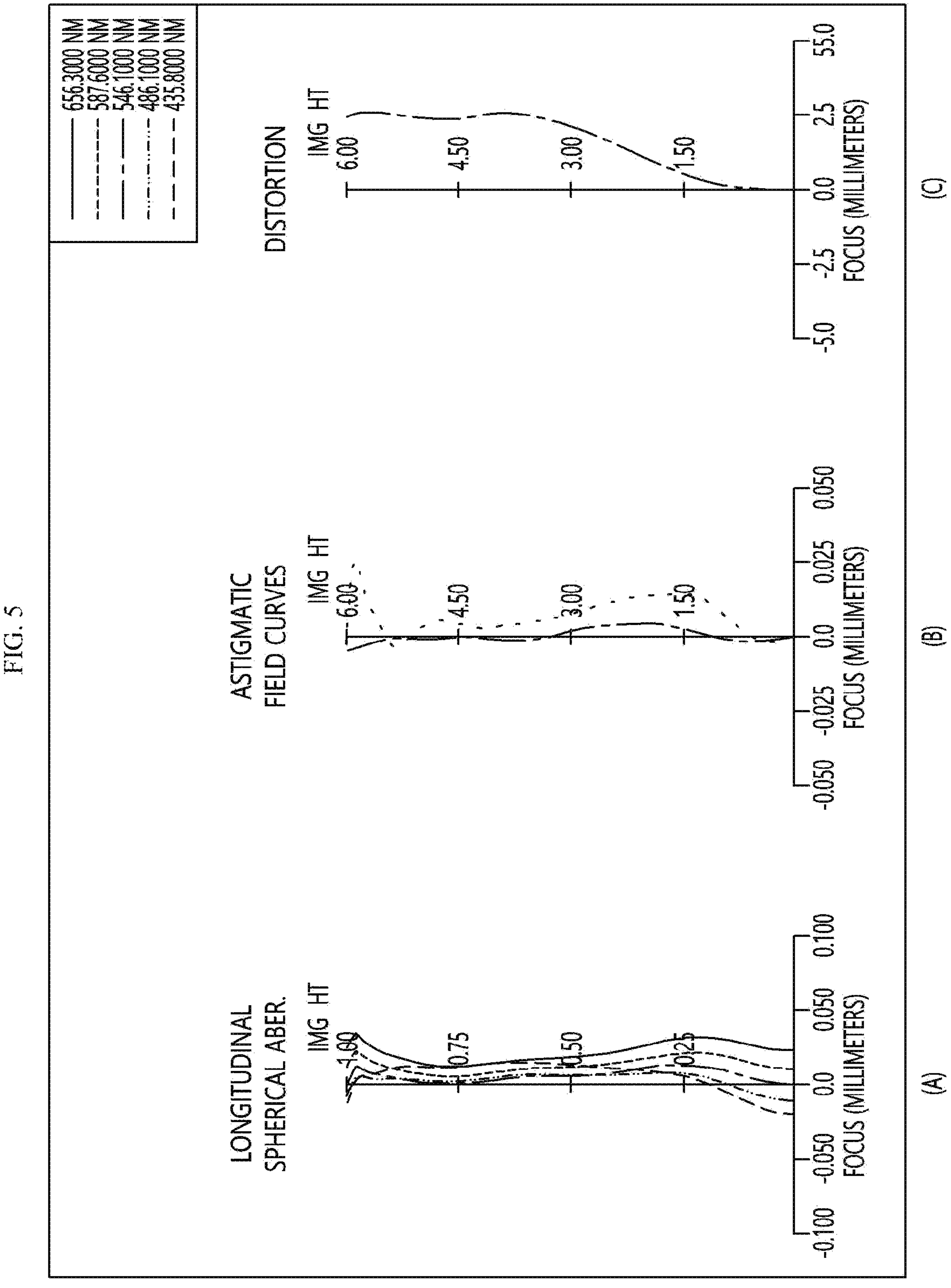
FIG. 5(A)(B)(C) are graphs showing longitudinal spherical aberration, astigmatic field curves, and distortion in the optical system of FIG. 1.

FIG. 5 is an analysis graph showing longitudinal spherical aberration, astigmatism, and distortion of the optical system of FIG. 1. By the optical system according to the first embodiment, spherical aberration as shown in FIG. 5(A) may be exhibited, and the spherical aberration may be a phenomenon in which the focusing positions of light passing through different parts (e.g., center part and peripheral part) of the lens are changed. The horizontal axis represents the degree of longitudinal spherical aberration, and the vertical axis represents the normalization of the distance from the center of the optical axis, and the change of the longitudinal spherical aberration according to the wavelength of light may be shown. The longitudinal spherical aberration may be represented, for example, for light with wavelength of about 656.2725 nm, about 587.5618 nm, about 546.0740 nm, about 486.1327 nm, or about 435.8343 nm, respectively. Referring to FIG. 5(A), it may be seen that the longitudinal spherical aberration of the optical system is limited to within +0.025 to −0.025, showing stable optical properties. FIG. 5(B) is a graph showing astigmatism in the optical system according to the first embodiment. The astigmatism may be that when a tangential plane or a meridian plane and a sagittal plane of the lens have different radii, the focus of light passing through the vertical direction and the horizontal direction may be shifted from each other. Astigmatism of the optical system is a result obtained at a wavelength of about 546.0740 nm. The solid line indicates astigmatism (e.g., meridional curvature) in the tangential direction, and the dotted line indicates astigmatism (e.g., sagittal curve) in the sagittal direction. As may be seen from FIG. 5(B), it may be confirmed that the astigmatism is limited to within +0.050 to −0.050 or +0.025 to −0.025 to show stable optical properties.

FIG. 5(C) is a graph showing distortion according to the optical system of the first embodiment. Distortion aberration occurs because the optical magnification changes according to the distance from the optical axis (O-I). Compared to the image formed on the theoretical imaging plane, the image formed on the actual imaging plane (e.g., 190 in FIG. 1) may look larger or smaller. In FIG. 5(C), the distortion of the optical system is a result obtained at a wavelength of about 546.0740 nm, and the image captured through the optical system may be slightly distorted at a point deviating from the optical axis (O-I). However, such distortion is generally at a level that may be seen in an optical device using a lens, and the distortion rate is less than about 3%, so that good optical properties may be provided.

Figure 6:
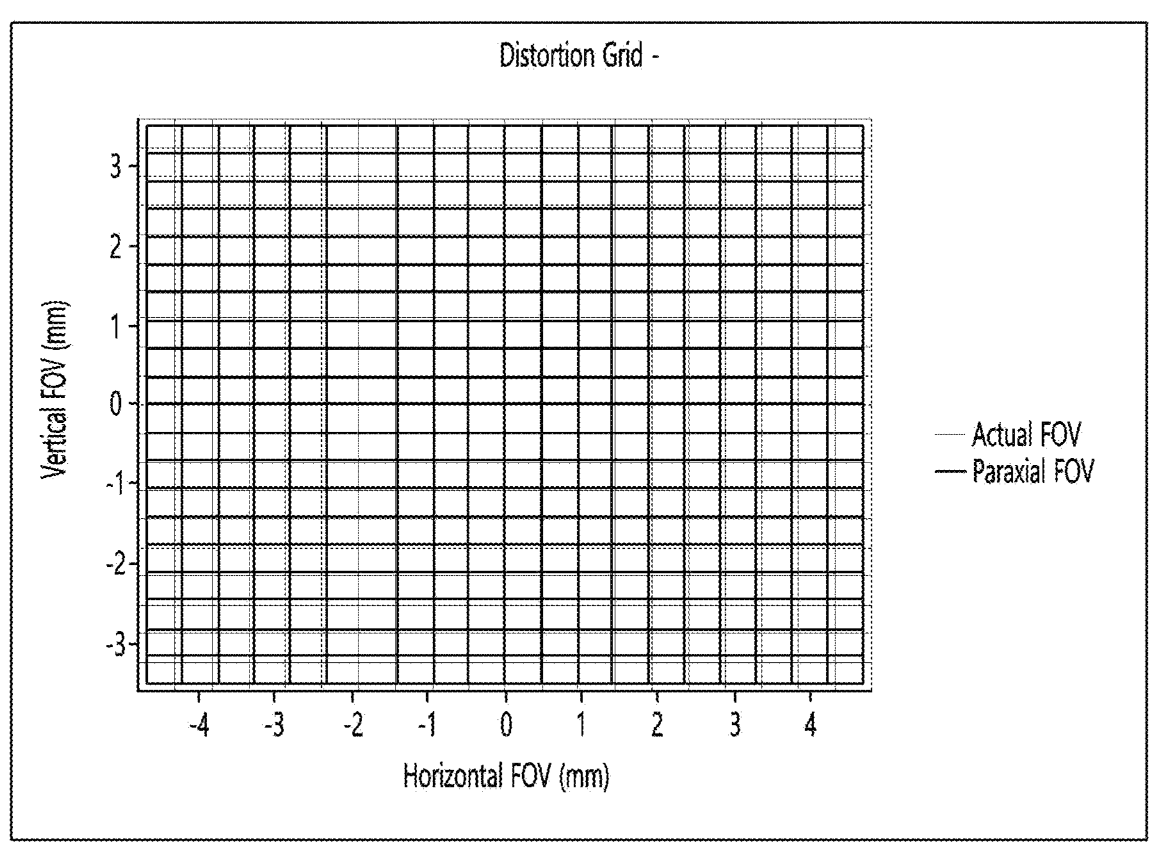
FIG. 6 is a diagram illustrating a distortion grid in the optical system of FIG. 1.
Figure 7:
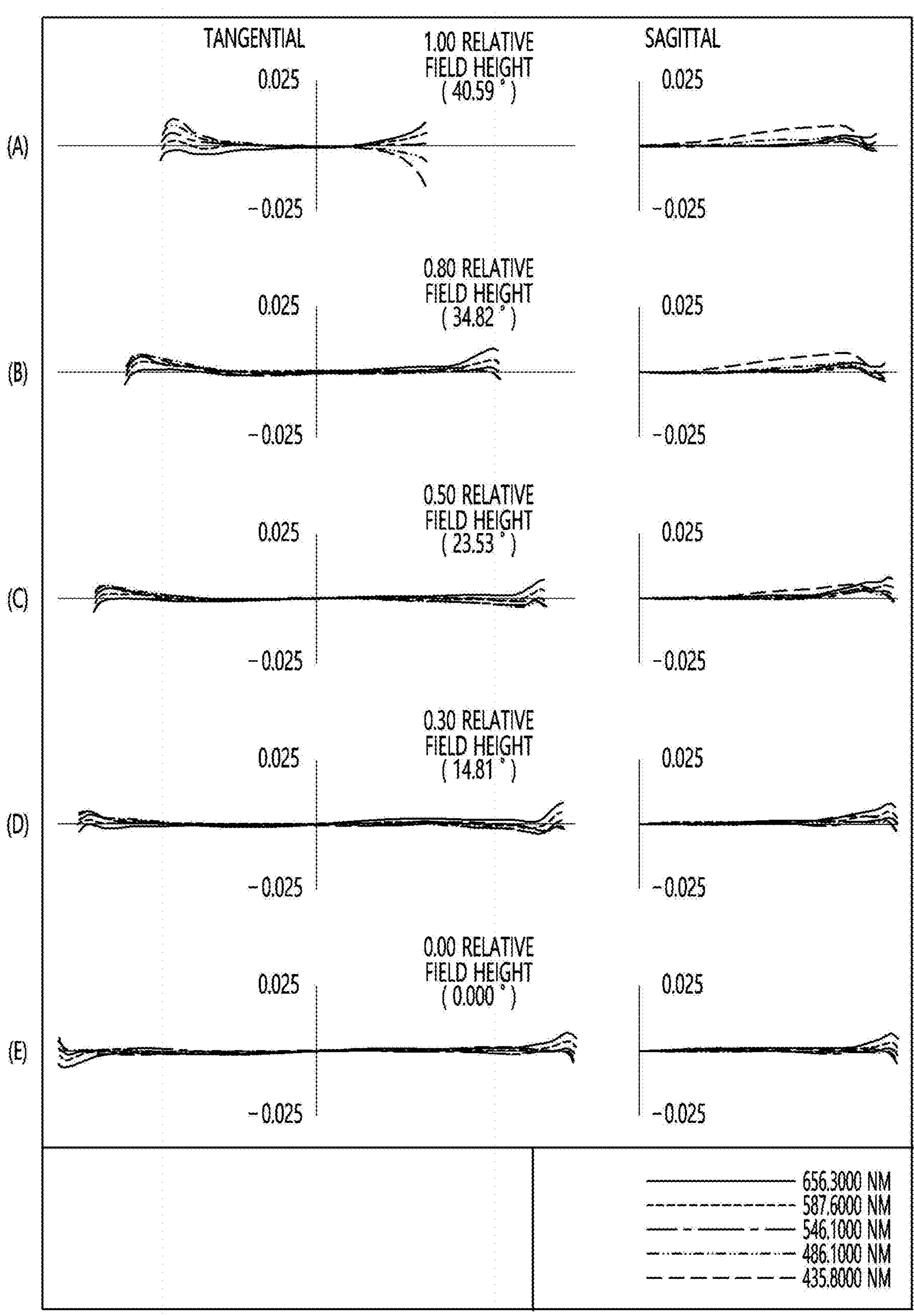
FIG. 7(A)-(E) are analysis graphs showing lateral aberration in the region where the relative field height on the optical axis is 0.0 to 1.0 in the tangential field curvature and the sagittal field curvature of the optical system of FIG. 1.

FIG. 6 is a distortion grid that occurs when light is emitted from the optical system according to the first embodiment. Here, it may be confirmed that distortion occurs in the left and right outer sides in the horizontal direction FOV (Field of View), and the distortion of the left and right outer regions may be greater than the distortion generated in upper and lower outer regions of the vertical direction FOV. FIG. 7(A)-(E) is an analysis graph showing lateral aberration in a region where the relative field height on the optical axis is 0.0 to 1.0 on the tangential field curvature and the sagittal field curvature of the optical system shown in FIG. 1, and it may be confirmed that an optical system with good lateral aberration correction may be obtained.

A second embodiment will be referred to FIG. 2. Table 3 below is a value shows the radius of curvature (mm) of the surface of each lens of the second embodiment, the center thickness (mm) of each lens, the center interval (mm) between adjacent lenses, refractive index, and Abbe number shown in FIG. 2.

TABLE 3

| Lens | Surface | Radius | Thickness/ Interval | Index | Abbe # |
|---|---|---|---|---|---|
| Lens 1 | S1 | 2.624 | 0.946 | 1.5343 | 55.656 |
| | S2 | 13.025 | 0.241 | | |
| Aperture | Stop | Infinity | −0.202 | | |
| Lens 2 | S3 | 4.663 | 0.331 | 1.68061 | 18.453 |
| | S4 | 3.064 | 0.558 | | |
| Lens 3 | S5 | −22.157 | 0.306 | 1.5343 | 55.656 |
| | S6 | −19.738 | 0.103 | | |
| Lens 4 | S7 | 16.971 | 0.434 | 1.6142 | 25.592 |
| | S8 | 11.597 | 0.073 | | |
| Lens 5 | S9 | 47.746 | 0.432 | 1.5343 | 55.656 |
| | S10 | −29.486 | 0.288 | | |
| Lens 6 | S11 | 3.865 | 0.426 | 1.588 | 28.269 |
| | S12 | 3.843 | 0.720 | | |
| Lens 7 | S13 | 30.734 | 1.273 | 1.5343 | 55.656 |
| | S14 | −2.483 | 0.306 | | |
| Lens 8 | S15 | −4.628 | 0.749 | 1.5343 | 55.656 |
| | S16 | 2.595 | 0.428 | | |
| Optical filter | S17 | Infinity | 0.210 | 1.5231 | 54.49 |
| | S18 | Infinity | 0.640 | | |

In Table 3, the thickness is the thickness (mm) of the center of each lens of FIG. 2, and the interval is the distance (mm) between two adjacent lenses. S17 is an incident side surface of the optical filter, and S18 is an exit surface of the optical filter. Table 4 shows the values of the aspheric coefficients of the surfaces of each lens of FIG. 2.

TABLE 4

| Surface | K | A | B | C | D |
|---|---|---|---|---|---|
| S1 | 0.005970318 | −0.00051386 | 3.79E−03 | −0.00827267 | 0.00991487 |
| S2 | 0.277690935 | −0.03542029 | 0.06382477 | −0.07648724 | 0.062728111 |
| S3 | −0.11739976 | −0.03850926 | 0.055888189 | −0.05284092 | 0.030397165 |
| S4 | 0.911638257 | −0.01142313 | −0.00037159 | 0.033038466 | −6.81E−02 |
| S5 | 147.872187 | −0.00022879 | 0.004476255 | −0.02165868 | 0.042758352 |
| S6 | −14.5248223 | 5.60E−05 | 0.008248989 | −0.03814713 | 0.065679281 |
| S7 | 0 | 0.02223933 | 0.024059551 | −0.05833109 | 0.078025879 |
| S8 | 0 | 0.02223933 | 0.024059551 | −0.05833109 | 0.078025879 |
| S9 | 0 | −0.00442548 | 0.038116033 | −7.21E−02 | 0.066710023 |
| S10 | 0 | −0.00552729 | 0.015331895 | −0.01645371 | 0.009190032 |
| S11 | −0.69711133 | −0.04726053 | 0.01746523 | −0.00790636 | 0.002196705 |
| S12 | −1.48413597 | −0.03776508 | 0.009688479 | −0.00255213 | 0.000351884 |
| S13 | −98.4194844 | 0.001261657 | −0.0017644 | −0.00090309 | 0.000874657 |
| S14 | −1.10530355 | 0.057024289 | −0.0246293 | 0.006831321 | −0.00116848 |
| S15 | −1.66750197 | 0.001410473 | −0.01117943 | 0.003706994 | −0.0005614 |
| S16 | −9.14926454 | −0.01781606 | 0.003359641 | −0.00053463 | 6.29E−05 |
| S17 | 0 | −0.02223933 | 0.024059551 | −0.05833109 | 0.078025879 |
| S18 | 0 | −0.02223933 | 0.024059551 | −0.05833109 | 0.078025879 |

| Surface | E | F | G | H | J |
|---|---|---|---|---|---|
| S1 | −0.00741046 | 3.43E−03 | −9.66E−04 | 1.50E−04 | −9.95E−06 |
| S2 | −0.03547862 | 0.013456959 | −3.27E−03 | 4.60E−04 | −2.86E−05 |
| S3 | −0.00596848 | −0.00383309 | 2.94E−03 | −7.76E−04 | 7.54E−05 |
| S4 | 0.077644324 | −0.05259533 | 2.10E−02 | −4.55E−03 | 4.08E−04 |
| S5 | −0.04859952 | 3.45E−02 | −1.50E−02 | 3.68E−03 | −3.88E−04 |
| S6 | −0.0652709 | 4.07E−02 | −1.56E−02 | 3.35E−03 | −3.10E−04 |
| S7 | −0.0644542 | 3.34E−02 | −1.06E−02 | 1.87E−03 | −1.41E−04 |
| S8 | −0.0644542 | 0.033420267 | −1.06E−02 | 1.87E−03 | −1.41E−04 |
| S9 | −0.03585126 | 1.18E−02 | −2.32E−03 | 2.53E−04 | −1.17E−05 |
| S10 | −0.0027267 | 0.000328263 | 2.55E−05 | −1.07E−05 | 7.95E−07 |
| S11 | −0.0002396 | −6.97E−05 | 3.18E−05 | −5.06E−06 | 2.99E−07 |
| S12 | 4.32E−06 | −7.00E−06 | 5.78E−07 | 1.06E−08 | −2.03E−09 |
| S13 | −0.00033074 | 6.75E−05 | −7.74E−06 | 4.68E−07 | −1.16E−08 |

TABLE 4-continued

| | | | | | |
|---|---|---|---|---|---|
| S14 | 1.25E−04 | −8.16E−06 | 2.92E−07 | −3.87E−09 | −2.53E−11 |
| S15 | 4.97E−05 | −2.73E−06 | 9.22E−08 | −1.76E−09 | 1.45E−11 |
| S16 | −5.06E−06 | 2.58E−07 | −7.72E−09 | 1.21E−10 | −7.50E−13 |
| S17 | −0.0644542 | 3.34E−02 | −1.06E−02 | 1.87E−03 | −1.41E−04 |
| S18 | −0.0644542 | 0.033420267 | −1.06E−02 | 1.87E−03 | −1.41E−04 |

Figure 8:
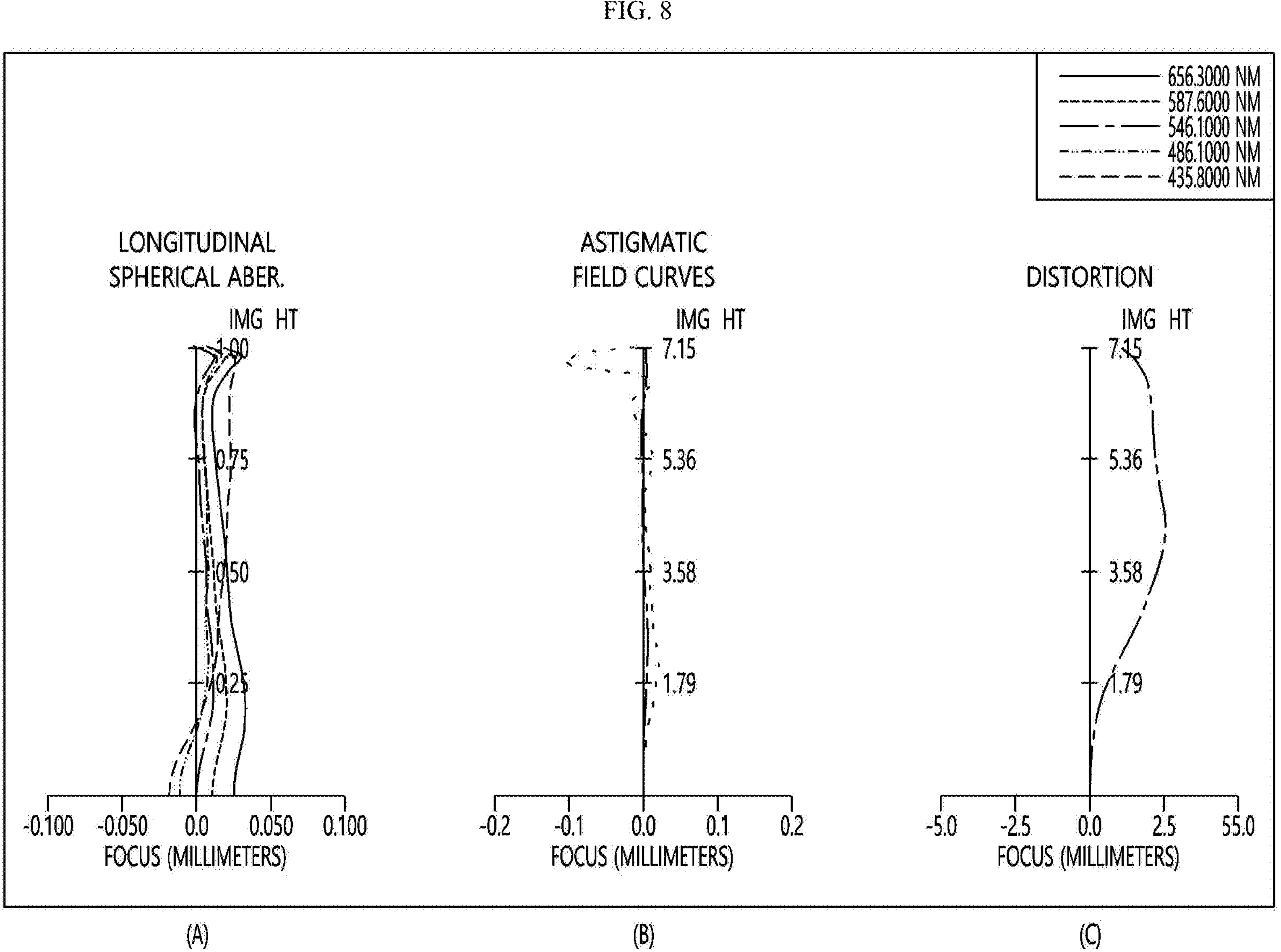
FIG. 8(A)(B)(C) are graphs showing spherical aberration, astigmatic field curves, and distortion in the optical system of FIG. 2.

FIG. 8 is an analysis graph showing longitudinal spherical aberration, astigmatism, and distortion of the optical system of FIG. 2. By the optical system according to the second embodiment, spherical aberration as shown in FIG. 8(A) may be exhibited, and the spherical aberration may be a phenomenon in which the focusing positions of light passing through different parts (e.g., center part and peripheral part) of the lens are changed. The horizontal axis represents the degree of longitudinal spherical aberration, and the vertical axis represents the normalization of the distance from the center of the optical axis, and the change of the longitudinal spherical aberration according to the wavelength of light may be shown. The longitudinal spherical aberration may be represented, for example, for light with wavelength of about 656.2725 nm, about 587.5618 nm, about 546.0740 nm, about 486.1327 nm, or about 435.8343 nm, respectively. Referring to FIG. 8(A), it may be seen that the longitudinal spherical aberration of the optical system is limited to within +0.025 to −0.025, showing stable optical properties. FIG. 8(B) is a graph showing astigmatism in the optical system according to the second embodiment. The astigmatism may be that when a tangential plane or a meridian plane and a sagittal plane of the lens have different radii, the focus of light passing through the vertical direction and the horizontal direction may be shifted from each other. Astigmatism of the optical system is a result obtained at a wavelength of about 546.0740 nm. The solid line indicates astigmatism (e.g., meridional curvature) in the tangential direction, and the dotted line indicates astigmatism (e.g., sagittal curve) in the sagittal direction. As may be seen from FIG. 8(B), it may be confirmed that the astigmatism is limited to within +0.050 to −0.050 to show stable optical properties.

FIG. 8(C) is a graph showing distortion according to the optical system of the second embodiment. Distortion aberration occurs because the optical magnification changes according to the distance from the optical axis (O-I). Compared to the image formed on the theoretical imaging plane, the image formed on the actual imaging plane (e.g., 190 in FIG. 2) may look larger or smaller. In FIG. 8(C), the distortion of the optical system is a result obtained at a wavelength of about 546.0740 nm, and the image captured through the optical system may be slightly distorted at a point deviating from the optical axis (O-I). However, such distortion is generally at a level that may be seen in an optical device using a lens, and the distortion rate is less than about 3%, so that good optical properties may be provided.

Figure 9:
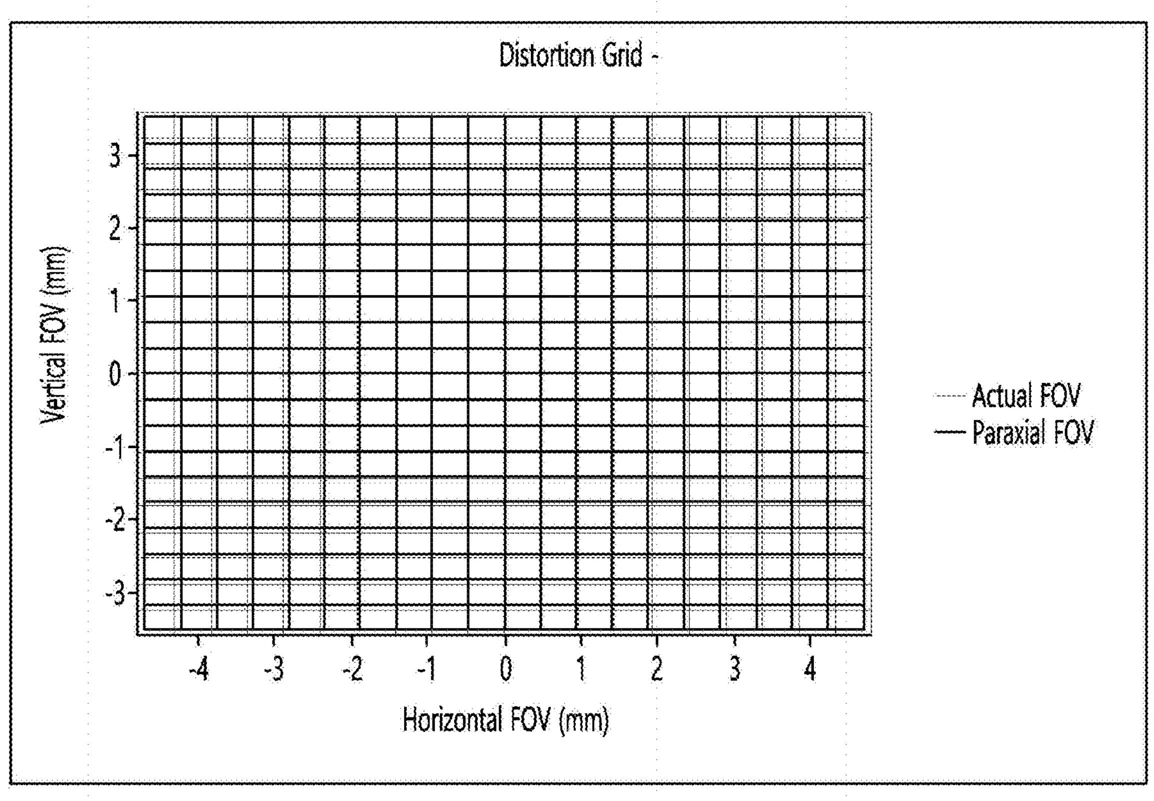
FIG. 9 is a diagram illustrating a distortion grid in the optical system of FIG. 2.
Figure 10:
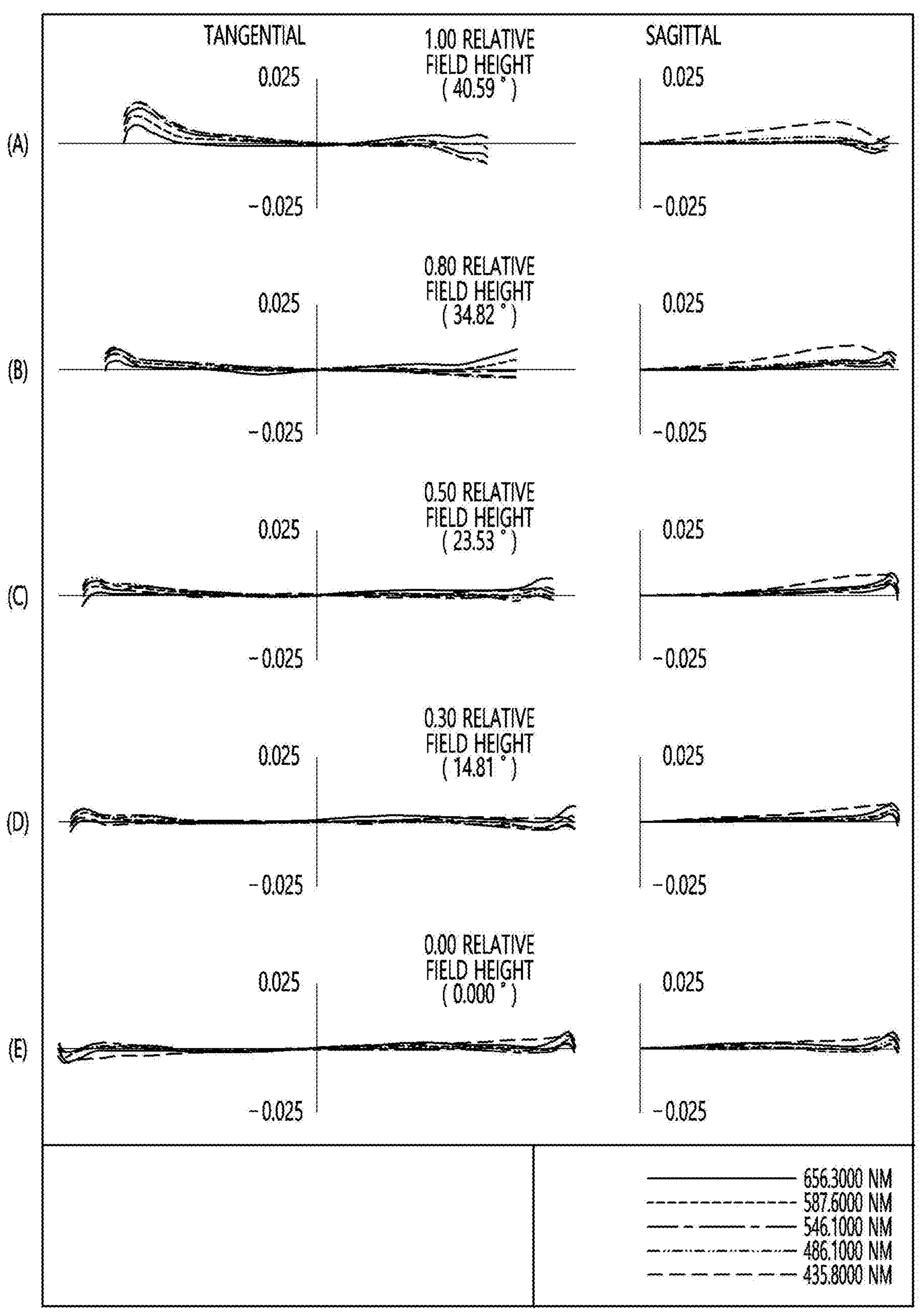
FIG. 10(A)-(E) are analysis graphs showing lateral aberration in the region where the relative field height on the optical axis is 0.0 to 1.0 in the tangential field curvature and the sagittal field curvature of the optical system of FIG. 2.

FIG. 9 is a distortion grid that occurs when light is emitted from the optical system according to the second embodiment. Here, it may be confirmed that distortion occurs in the left and right outer sides in the horizontal direction FOV (Field of View), and the distortion of the left and right outer regions may be greater than the distortion generated in upper and lower outer regions of the vertical direction FOV. FIG. 10(A)-(E) is an analysis graph showing lateral aberration in region where the relative field height on the optical axis is 0.0 to 1.0 in the tangential field curvature and the sagittal field curvature of the optical system shown in FIG. 2, and it may be confirmed that an optical system with good lateral aberration correction may be obtained.

The third embodiment refers to FIG. 3, and Table 5 shows the radius of curvature (mm) of the surface of each lens of the third embodiment, the center thickness (mm) of each lens, and the center interval (mm) between adjacent lenses, refractive index, and Abbe number, shown in FIG. 3.

TABLE 5

| Lens | Surface | Radius | Thickness/ Interval | Index | Abbe # |
|---|---|---|---|---|---|
| Lens 1 | S1 | 3.111 | 1.122 | 1.5441 | 56.115 |
| | S2 | 14.054 | 0.290 | | |
| Aperture | Stop | Infinity | −0.240 | | |
| Lens 2 | S3 | 5.453 | 0.355 | 1.68061 | 18.453 |
| | S4 | 3.643 | 0.659 | | |
| Lens 3 | S5 | −27.602 | 0.355 | 1.5343 | 55.656 |
| | S6 | −25.474 | 0.124 | | |
| Lens 4 | S7 | 21.668 | 0.431 | 1.68061 | 18.453 |
| | S8 | 16.022 | 0.098 | | |
| Lens 5 | S9 | 46.424 | 0.483 | 1.5343 | 55.656 |
| | S10 | −38.417 | 0.345 | | |
| Lens 6 | S11 | 4.549 | 0.521 | 1.588 | 28.269 |
| | S12 | 4.463 | 0.890 | | |
| Lens 7 | S13 | 47.124 | 1.474 | 1.5441 | 56.115 |
| | S14 | −2.917 | 0.363 | | |
| Lens 8 | S15 | −5.336 | 0.860 | 1.5343 | 55.656 |
| | S16 | 3.099 | 0.511 | | |
| Optical filter | S17 | Infinity | 0.210 | 1.5231 | 54.49 |
| | S18 | Infinity | 0.787 | | |

In Table 5, the thickness is the thickness (mm) of the center of each lens of FIG. 3, and the interval is the distance (mm) between two adjacent lenses. S17 is an incident side surface of the optical filter, and S18 is an exit surface of the optical filter. Table 6 shows the values of the aspheric coefficients of the surfaces of each lens of FIG. 3.

TABLE 6

| Surface | K | A | B | C | D |
|---|---|---|---|---|---|
| S1 | 0.00303832 | −0.00031606 | 1.42E−03 | −0.00225586 | 0.00199268 |
| S2 | 1.482888491 | −0.02147925 | 0.029274455 | −0.02702107 | 0.017335299 |
| S3 | −0.04137198 | −0.02441421 | 0.027440957 | −0.02191988 | 0.01264962 |
| S4 | 0.919010216 | −0.00835002 | 0.003384833 | 0.00405256 | −8.32E−03 |
| S5 | 135.5202694 | 0.000871681 | −0.00199023 | 0.000406561 | 0.001439125 |
| S6 | −0.87604207 | 0.00243877 | −0.000741 | −0.00700361 | 0.010742233 |
| S7 | 0 | −0.01303242 | 0.010631297 | −0.01999695 | 0.02040677 |

TABLE 6-continued

| | | | | | |
|---|---|---|---|---|---|
| S8 | 0 | −0.01996794 | 0.01456514 | −0.01722457 | 0.011502915 |
| S9 | 0 | −0.0002392 | 0.009389634 | −1.32E−02 | 0.0082035 |
| S10 | 0 | −0.00165867 | 0.003328348 | −0.00197025 | 7.09E−05 |
| S11 | −0.71852803 | −0.02750763 | 0.006143587 | −0.0012614 | −7.16E−05 |
| S12 | −1.2252157 | −0.02183491 | 0.003041769 | 9.17E−05 | −0.00027879 |
| S13 | −34.9239803 | 0.001356409 | −0.00141775 | 3.32E−05 | 0.000104452 |
| S14 | −1.08641773 | 0.035308299 | −0.01113041 | 0.0022695 | −0.00028935 |
| S15 | −1.71984748 | 0.000674142 | −0.00467364 | 0.001100325 | −0.00011811 |
| S16 | −9.31229541 | −0.0121997 | 0.001952112 | −0.00026561 | 2.57E−05 |
| S17 | 0 | −0.01303242 | 0.010631297 | −0.01999695 | 0.02040677 |
| S18 | 0 | −0.01996794 | 0.01456514 | −0.01722457 | 0.011502915 |

| Surface | E | F | G | H | J |
|---|---|---|---|---|---|
| S1 | −0.00109945 | 3.76E−04 | −7.79E−05 | 8.94E−06 | −4.36E−07 |
| S2 | −0.0077094 | 0.002299347 | −4.38E−04 | 4.80E−05 | −2.31E−06 |
| S3 | −0.00484544 | 0.001159556 | −1.55E−04 | 8.64E−06 | 2.07E−08 |
| S4 | 0.007747357 | −0.00409318 | 1.26E−03 | −2.09E−04 | 1.45E−05 |
| S5 | −0.00192471 | 1.26E−03 | −4.60E−04 | 8.91E−05 | −7.14E−06 |
| S6 | −0.00858023 | 4.22E−03 | −1.26E−03 | 2.08E−04 | −1.47E−05 |
| S7 | −0.01318652 | 5.45E−03 | −1.40E−03 | 2.01E−04 | −1.25E−05 |
| S8 | −0.00473446 | 0.001234391 | −2.02E−04 | 1.91E−05 | −8.10E−07 |
| S9 | −0.00282769 | 5.71E−04 | −6.64E−05 | 4.01E−06 | −9.06E−08 |
| S10 | 0.000335741 | −0.00014633 | 2.84E−05 | −2.72E−06 | 1.0SE−07 |
| S11 | 0.00011507 | −3.31E−05 | 5.02E−06 | −4.23E−07 | 1.53E−08 |
| S12 | 8.62E−05 | −1.34E−05 | 1.16E−06 | −5.41E−08 | 1.06E−09 |
| S13 | −3.49E−05 | 5.30E−06 | −4.30E−07 | 1.80E−08 | −3.07E−10 |
| S14 | 2.37E−05 | −1.26E−06 | 4.32E−08 | −8.81E−10 | 8.53E−12 |
| S15 | 7.44E−06 | −2.95E−07 | 7.32E−09 | −1.05E−10 | 6.66E−13 |
| S16 | −1.66E−06 | 6.81E−08 | −1.70E−09 | 2.33E−11 | −1.36E−13 |
| S17 | −0.01318652 | 5.45E−03 | −1.40E−03 | 2.01E−04 | −1.25E−05 |
| S18 | −0.00473446 | 0.001234391 | −2.02E−04 | 1.91E−05 | −8.10E−07 |

Figure 11:
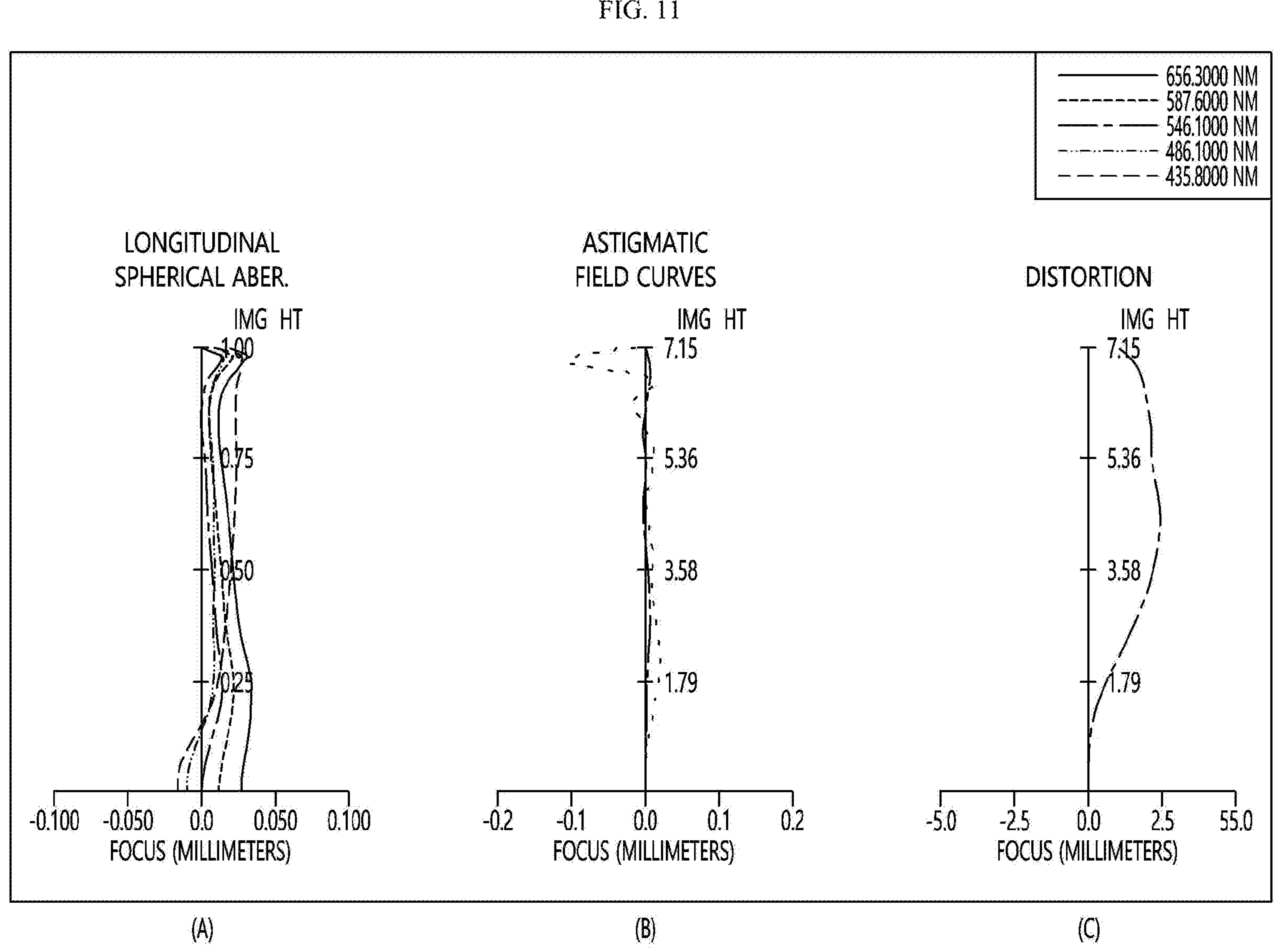
FIG. 11(A)(B)(C) are graphs showing longitudinal spherical aberration, astigmatic field curves, and distortion in the optical system of FIG. 3.

FIG. 11 is an analysis graph showing longitudinal spherical aberration, astigmatism, and distortion of the optical system of FIG. 3. By the optical system according to the third embodiment, spherical aberration as shown in FIG. 11(A) may be exhibited, and the spherical aberration may be the focus of light passing through different parts (e.g., central part, peripheral part) of the lens. It may be a phenomenon in which the focusing positions of light passing through different parts (e.g., center part and peripheral part) of the lens are changed. The horizontal axis represents the degree of longitudinal spherical aberration, and the vertical axis represents the normalization of the distance from the center of the optical axis, and the change of the longitudinal spherical aberration according to the wavelength of light may be shown. The longitudinal spherical aberration may be represented, for example, for light with wavelength of about 656.2725 nm, about 587.5618 nm, about 546.0740 nm, about 486.1327 nm, or about 435.8343 nm, respectively. Referring to FIG. 11(A), it may be seen that the longitudinal spherical aberration of the optical system is limited to within +0.025 to −0.025, showing stable optical properties. FIG. 11(B) is a graph showing astigmatism in the optical system according to the third embodiment. The astigmatism may be that when a tangential plane or a meridian plane and a sagittal plane of the lens have different radii, the focus of light passing through the vertical direction and the horizontal direction may be shifted from each other. Astigmatism of the optical system is a result obtained at a wavelength of about 546.0740 nm. The solid line indicates astigmatism (e.g., meridional curvature) in the tangential direction, and the dotted line indicates astigmatism (e.g., sagittal curve) in the sagittal direction. As may be seen from FIG. 11(B), it may be confirmed that the astigmatism is limited to within +0.050 to −0.050 to show stable optical properties.

FIG. 11(C) is a graph showing distortion according to the optical system of the third embodiment. Distortion aberration occurs because the optical magnification changes according to the distance from the optical axis (O-I). Compared to the image formed on the theoretical imaging plane, the image formed on the actual imaging plane (e.g., 190 in FIG. 3) may look larger or smaller. In FIG. 11(C), the distortion of the optical system is a result obtained at a wavelength of about 546.0740 nm, and the image captured through the optical system may be slightly distorted at a point deviating from the optical axis (O-I). However, such distortion is generally at a level that may be seen in an optical device using a lens, and the distortion rate is less than about 3%, so that good optical properties may be provided.

Figure 12:
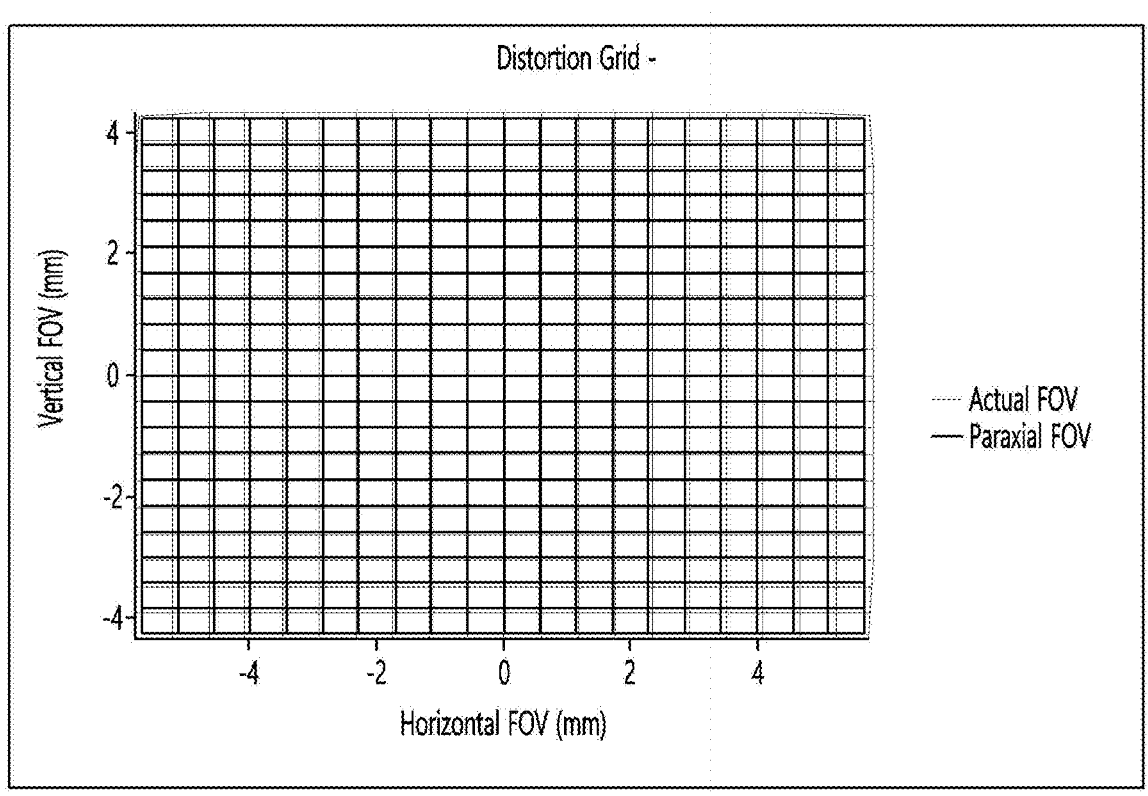
FIG. 12 is a diagram illustrating a distortion grid in the optical system of FIG. 3.
Figure 13:
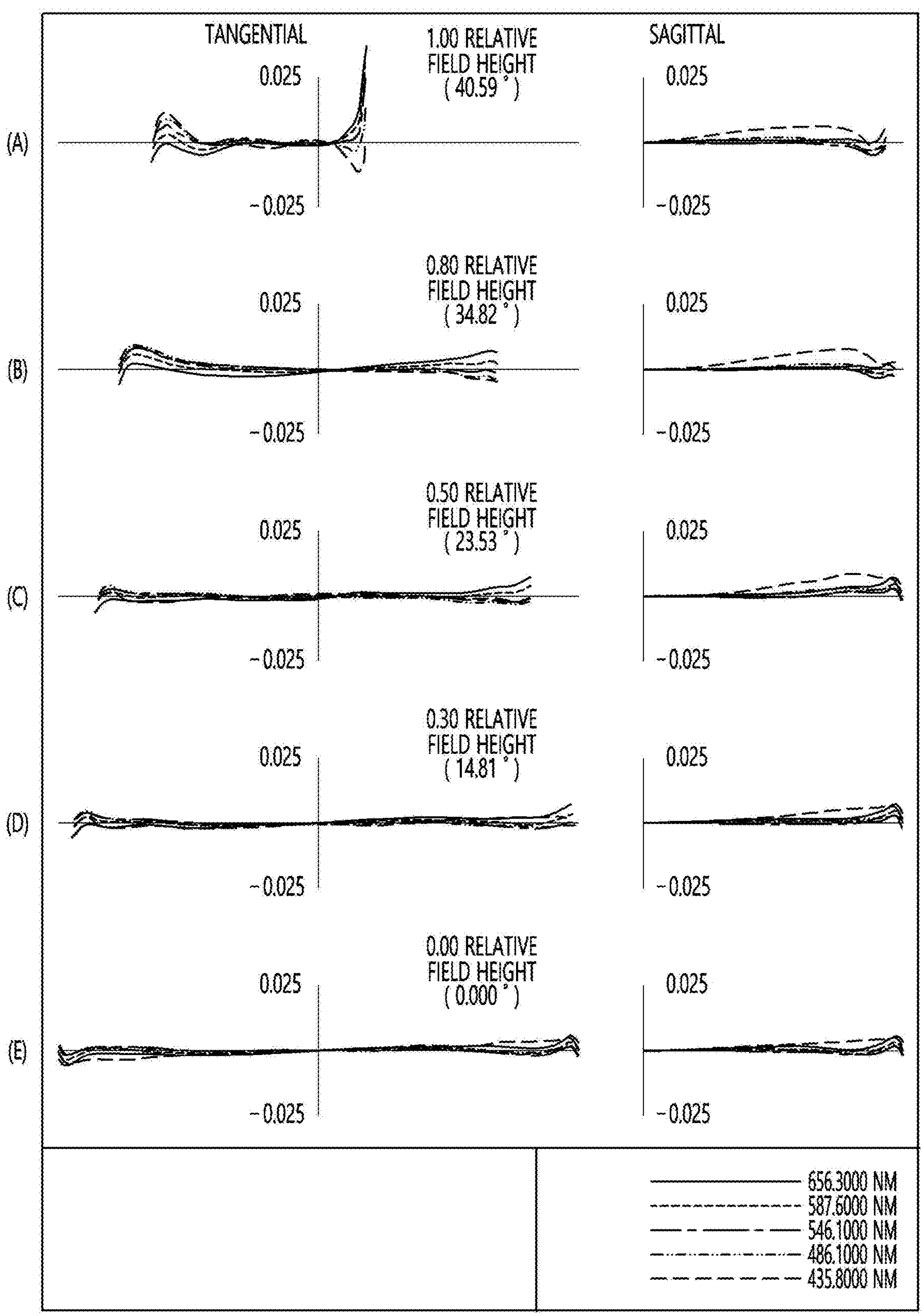
FIG. 13(A)-(E) are analysis graphs showing lateral aberration in the region where the relative field height on the optical axis is 0.0 to 1.0 in the tangential field curvature and the sagittal field curvature of the optical system of FIG. 3.

FIG. 12 is a distortion grid that occurs when light is emitted from the optical system according to the third embodiment. Here, it may be confirmed that distortion occurs in the left and right outer sides in the horizontal direction FOV (Field of View), and the distortion of the left and right outer regions may be greater than the distortion generated in upper and lower outer regions of the vertical direction FOV. FIG. 13(A)-(E) is an analysis graph showing lateral aberration in region where the relative field height on the optical axis is 0.0 to 1.0 in the tangential field curvature and the sagittal field curvature of the optical system shown in FIG. 3, and it may be confirmed that an optical system with good lateral aberration correction may be obtained.

As in the above first to third embodiments, it may be seen that each of the lenses 111 to 118 may be formed of a plastic lens, and all surfaces of each lens have aspheric coefficients.

In the first to third embodiments of the invention, the center thickness of the seventh lens 117 is the thickest among the lenses of the optical system, and may be, for example, 1 mm or more.

The first interval between the second lens 112 and the third lens 113 and the second interval between the sixth lens 116 and the seventh lens 117 along the optical axis are may be greater than an interval between the first lens 111 and the second lenses 112 or an optical axis interval between the third lens 113 and the fourth lens 114 may be greater, or may be larger than the optical axis distances among the fourth to sixth lenses 114, 115, and 116. The first and second intervals may be, for example, 0.4 mm or more. The first interval along the optical axis may be smaller than the second interval.

The first interval between the second lens 112 and the third lens 113 and the second interval between the sixth lens 116 and the seventh lens 117 along the optical axis may be greater than the optical axis interval between the seventh and eighth lenses 117 and 118. The optical system according to the first to third embodiments of the invention may satisfy at least one or two or more of the following equations. Accordingly, the optical systems according to the first to third embodiments may have optically improved effects.

Table 7 may satisfy the following conditions in the optical systems of the first to third embodiments.

TABLE 7

| Item | First embodiment | Second embodiment | Third embodiment |
|---|---|---|---|
| BFL | 1.285 | 1.278 | 1.507 |
| TTL | 8.186 | 8.263 | 9.635 |
| Img | 6 | 6 | 7.15 |
| F | 6.737 | 6.852 | 8.023 |
| f12 | 8.582 | 8.722 | 10.274 |
| L1R1 | 2.63 | 2.624 | 3.111 |
| L1R2 | 13.464 | 13.025 | 14.054 |
| L2R1 | 4.776 | 4.663 | 5.453 |
| L2R2 | 3.077 | 3.064 | 3.643 |
| G1 | 1.5441 | 1.5343 | 1.5441 |
| G2 | 1.6714 | 1.68061 | 1.68061 |
| G6 | 1.588 | 1.588 | 1.588 |
| G7 | 1.5441 | 1.5343 | 1.5441 |
| T1 | 0.949 | 0.946 | 1.122 |
| T2 | 0.319 | 0.331 | 0.355 |
| T6 | 0.406 | 0.426 | 0.521 |
| T7 | 1.271 | 1.273 | 1.474 |
| f1 | 5.809 | 5.935436 | 7.057 |
| F2 | −13.779 | −14.161 | −17.303 |
| f3 | 182.899 | 322.564 | 581.838 |
| f4 | −56.898 | −60.958 | −92.079 |
| f5 | 33.665 | 34 | 39.253 |
| f6 | 288.762 | 183.503 | 316.217 |
| f7 | 4.184 | 4.339 | 5.079 |
| f8 | −2.93 | −2.99 | −3.528 |
| Inf61 | 1.548 | 1.558 | 1.852 |
| Inf62 | 1.784 | 1.812 | 2.314 |
| Inf82 | 2.314 | 2.322 | 2.636 |
| D11 | 1.73 | 1.78 | 2.08 |
| D31 | 1.4 | 1.439 | 1.7 |
| D61 | 2.239 | 2.239 | 2.569 |
| D62 | 2.758 | 2.774 | 3.234 |
| D81 | 4.2 | 4.2 | 5.005 |
| D82 | 4.888 | 4.898 | 5.748 |
| T11 | 0.621 | 0.66 | 0.763 |
| T81 | 1.255 | 1.235 | 1.469 |
| T82 | 0.842 | 0.804 | 1.058 |

In Table 7 above, F is the total focal length, f2 is the combined focal length from the first lens 111 to the second lens 112, and L1R1 is is the radius of curvature of the object-side surface S1 of the first lens 111, L1R2 is the radius of curvature of the image-side surface S2 of the first lens 111, L2R1 is the radius of curvature of the object-side surface S3 of the second lens 112, and L2R2 is is the radius of curvature of the image-side surface S4 of the second lens 112, G1, G2 is the refractive index at 587 nm of the first and second lenses (111, 112), G6 and G7 are the refractive indies at 587 nm of the sixth and seventh lenses 116 and 117, T1, T2, T6, and T7 are the center thicknesses of the first lens 111, the second lens 112, the sixth lens 116, and the seventh lens 117, f1, f2, f3, f4, f5, f6, f7, and f8 are focal lengths of the first to eighth lenses 111 to 118, respectively. From Table 7, through comparison with different values based on each numerical value, when the value has a difference of large, small, and 0.1 mm or less, it may be described as the same, large, or small. In FIGS. 1 to 3 and Table 7, D11 is the straight distance from the optical axis Lx to the effective diameter of the object-side surface S1 of the first lens 111, and D31 is the straight distance from the optical axis Lx to the effective diameter of the object-side surface S5 of the third lens 113, D61 is the straight distance from the optical axis to the effective diameter of the object-side surface S11 of the sixth lens 116, and D62 is the straight distance from the optical axis to the effective diameter of the image-side surface of the sixth lens 116, D81 is the straight distance from the optical axis to the effective diameter of the object-side surface S15 of the eighth lens 118, and D82 is the straight distance from the optical axis to the effective diameter of the image-side surface S16 of the eighth lens 118, T11 is the optical axis distance from the apex of the object-side surface S1 of the first lens 111 to the effective diameter, and T81 is the optical axis distance from the apex of the object-side surface S15 of the eighth lens 118, and T82 is the optical axis distance from the apex of the image-side surface S16 of the eighth lens 118 to the effective diameter.

Table 8 may be represented by Equation 1 to Equation 25 by reflecting the characteristics of each lens of the optical system. The optical systems of the first to third embodiments may satisfy the range of at least one, two or more, or all of the following Equations 1 to 25.

TABLE 8

| Equation # | Range of Equation |
|---|---|
| eq1. | $0 < BFL/TTL < 0.3$ |
| eq2. | $0 < BFL/Img < 0.3$ |
| eq3. | $0.5 < F/TTL < 1.2$ |
| eq4. | $0.5 < TTL/(Img \times 2) < 0.8$ |
| eq5. | $0.5 < TTL/(D82 \times 2) < 1.2$ |
| eq6. | $0.5 < f1/F < 2$ |
| eq7. | $-5 < f1/f2 < 0$ |
| eq8. | $0.5 < f12/F < 5$ |
| eq9. | $0.3 < f1/f12 < 3$ |
| eq10. | $0 < L1R1/\lvert L1R2\rvert < 1$ |
| eq11. | $0 < L2R2/\lvert L2R1\rvert < 1$ |
| eq12. | $0.8 < G1/G2 < 1.2$ |
| eq13. | $0.8 < G7/G6 < 1.2$ |
| eq14. | $0.1 < T2/T1 < 0.8$ |
| eq15. | $0.1 < T6/T7 < 0.8$ |
| eq16. | $0.5 < Inf61/Inf62 < 1.2$ |
| eq17. | $0.4 < Inf61/Inf82 < 1$ |
| eq18. | $0.4 < Inf62/Inf82 < 1$ |
| eq19. | $0.4 < Inf61/D61 < 1$ |
| eq20. | $0.4 < Inf62/D62 < 1$ |
| eq21. | $0.2 < Inf82/D82 < 1.0$ |
| eq22. | $0 < T81/D81 < 0.6$ |
| eq23. | $0 < T82/D82 < 0.5$ |
| eq24. | $1 < D11/D31 < 2$ |
| eq25. | $2 < D82/D11 < 5$ |

Table 9 may be represented as detailed numerical ranges according to each equation in the optical systems of the first to third embodiments based on Table 8.

TABLE 9

| Equation # | Equation item | First embodiment | Second embodiment | Third embodiment |
|---|---|---|---|---|
| eq1. | BFL/TTL | 0.157 | 0.155 | 0.156 |
| eq2. | BFL/Img | 0.214 | 0.213 | 0.211 |
| eq3. | F/TTL | 0.823 | 0.829 | 0.833 |

TABLE 9-continued

| Equation # | Equation item | First embodiment | Second embodiment | Third embodiment |
|---|---|---|---|---|
| eq4 | TTL/(Img × 2) | 0.682 | 0.689 | 0.674 |
| eq5. | TTL/(D82 × 2) | 0.837 | 0.844 | 0.838 |
| eq6. | f1/F | 0.862 | 0.866 | 0.880 |
| eq7. | f1/f2 | −0.422 | −0.419 | −0.408 |
| eq8. | f12/F | 1.274 | 1.273 | 1.281 |
| eq9 | f1/f12 | 0.677 | 0.681 | 0.687 |
| eq10. | L1R1/\|L1R2\| | 0.196 | 0.201 | 0.221 |
| eq11. | L2R2/\|L2R1\| | 0.644 | 0.657 | 0.668 |
| eq12. | G1/G2 | 0.924 | 0.913 | 0.919 |
| eq13. | G7/G6 | 0.972 | 0.966 | 0.972 |
| eq14. | T2/T1 | 0.336 | 0.350 | 0.316 |
| eq15. | T6/T7 | 0.319 | 0.335 | 0.353 |
| eq16. | Inf61/Inf62 | 0.868 | 0.860 | 0.800 |
| eq17. | Inf61/Inf82 | 0.669 | 0.671 | 0.703 |
| eq18. | Inf62/Inf82 | 0.771 | 0.780 | 0.878 |
| eq19. | Inf61/D61 | 0.691 | 0.696 | 0.721 |
| eq20. | Inf62/D62 | 0.647 | 0.653 | 0.716 |
| eq21. | Inf82/D82 | 0.473 | 0.474 | 0.459 |
| eq22. | T81/D81 | 0.299 | 0.294 | 0.294 |
| eq23. | T82/D82 | 0.172 | 0.164 | 0.184 |
| eq24. | D11/D31 | 1.236 | 1.237 | 1.224 |
| eq25. | D82/D11 | 2.825 | 2.752 | 2.763 |

The condition of $0<BFL/TTL<0.3$ in Equation 1 may provide a high-resolution optic system by providing TTL with a longer length compared to BFL. The condition of $0<BFL/Img<0.3$ in Equation 2 represents the relationship between the distance from the apex of the image-side sixteenth surface S16 of the eighth lens 118 to the image sensor 190 and the distance from the optical axis Lx to 1.0 F, and it is possible to provide an image sensor 190 having a high resolution and a large size by satisfying $(BFL\times 2)<Img$. The relationship between the total length of the optical system and the effective focal length was defined by $0.5<F/TTL<1.2$ in Equation 3. By $0.5<TTL/(Img\times 2)<0.8$ of Equation 4, the total length TTL may be provided in the range of 50% to 80% of the diagonal length of the image sensor 190.

In Equation 10, |L1R2| represents the absolute value of the radius of curvature of the image-side surface S2 of the first lens 111 and may be greater than the radius of curvature L1R1 of the object-side surface S1 of the first lens 111, In Equation 11, |L2R1| represents the absolute value of the radius of curvature of the object-side surface S3 of the second lens 112, and may be greater than the radius of curvature L2R2 of the image-side surface S4 of the second lens 112.

The optical performance may be improved by the thickness relation between the centers of the first, second, sixth, and seventh lenses 111, 112, 116, and 117 of Equations 14 and 15. According to Equations 16 and 18, the refractive power of the incident light may be improved through the relationship between the straight distance inf61 from the optical axis to the inflection point of the object-side surface S11 of the sixth lens 116, the straight distance inf62 from the optical axis to the inflection point of the image-side surface S12 of the sixth lens 116, and the liner distance inf82 from the optical axis to the inflection point of the image-side surface S16 of the eighth lens 118.

According to Equations 21 to 23, the straight distance D81 from the optical axis to the effective diameter of the object-side surface S15 of the eighth lens 118, the straight distance D82 from the optical axis from the effective diameter of the image-side surface S16 of the eighth lens 118, the straight distances D61 and D62 from the optical axis to the effective diameter of the object-side surface S11 and the image-side surface S12 of the sixth lens 116 are greater than the straight distances inf61, inf62, and inf82 from the optical axis to the inflection point. Accordingly, it is possible to provide an effective diameter outside the inflection point, thereby improving the refractive power of light.

By Equations 24 and 25, the refractive power of light in the first, third and eighth lenses 111, 113 and 118 may improve through the relationship between the optical axis distances from the apexes of the object-side surface or image-side surface of the first, third, and eighth lenses 111, 113, and 118 to the effective diameter, and the straight distance from the optical axis to the effective diameter.

The optical system according to the first to third embodiments of the invention may satisfy at least one, two or more, five or more, or all of Equations 1 to 25. In this case, the optical system may implement a high-quality and high-resolution imaging lens system. In addition, unnecessary light entering the optical system may be blocked by at least one of Equations 1 to 25, aberration may be corrected, and performance of the optical system may be improved.

Figure 14:
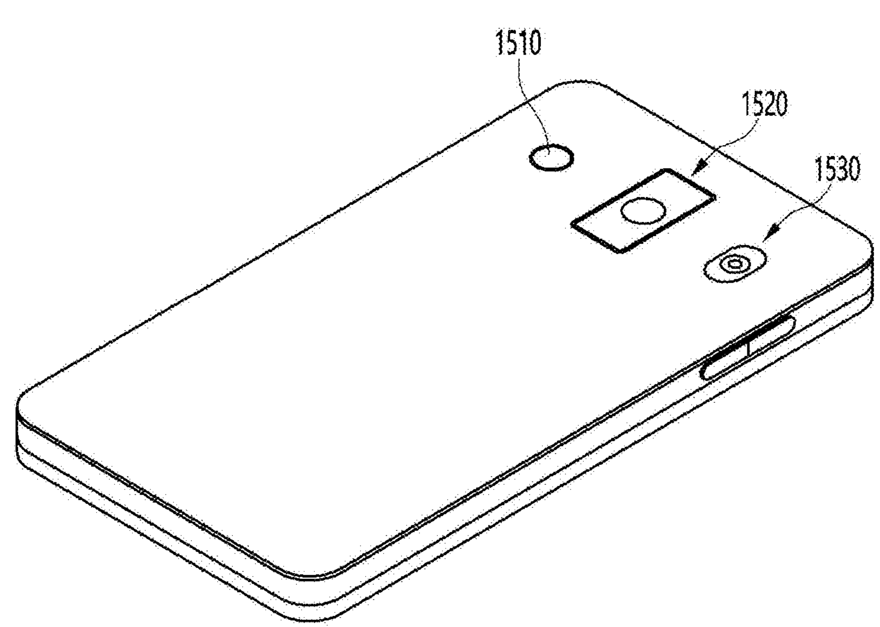
FIG. 14 is a perspective view of a mobile terminal having an optical system according to an embodiment of the invention.

FIG. 14 is a perspective view illustrating an example of a moving device to which an optical system according to an embodiment(s) of the invention is applied.

As shown in FIG. 14, the mobile terminal 1500 may include a camera module 1520, a flash module 1530, and an auto-focus device 1510 provided on one side or the rear side. Here, the auto-focus device 1510 may include a surface light emitting laser device and a light receiving unit as a light emitting layer. The flash module 1530 may include an emitter emitting light therein. The flash module 1530 may be operated by a camera operation of a mobile terminal or a user's control. The camera module 1520 may include an image capturing function and an auto focus function. For example, the camera module 1520 may include an auto-focus function using an image. The auto-focus device 1510 may include an auto-focus function using a laser. The auto focus device 1510 may be mainly used in a condition in which the auto focus function using the image of the camera module 1520 is deteriorated, for example, in proximity of 10 m or less or in a dark environment.

Features, structures, effects, etc. described in the above embodiments are included in at least one embodiment of the invention, and are not necessarily limited to only one embodiment. Furthermore, features, structures, effects, etc. illustrated in each embodiment may be combined or modified for other embodiments by those of ordinary skill in the art to which the embodiments belong. Accordingly, the contents related to such combinations and modifications should be interpreted as being included in the scope of the invention.

In addition, although the embodiment has been described above, it is only an example and does not limit the invention, and those of ordinary skill in the art to which the invention pertains are exemplified above in a range that does not depart from the essential characteristics of the present embodiment. It may be seen that various modifications and applications that have not been made are possible. For example, each component specifically shown in the embodiment may be implemented by modification. And the differences related to these modifications and applications should be construed as being included in the scope of the invention defined in the appended claims.

The invention claimed is:

1. An optical system comprising:

a first lens, a second lens, a third lens, a fourth lens, a fifth lens, a sixth lens, a seventh lens, and an eighth lens sequentially arranged along an optical axis from an object side to an image side, wherein the first lens has a positive refractive power and has a convex object-side surface, wherein the second lens has a negative refractive power and has a concave image-side surface, wherein at least one of an object-side surface and an image-side surface of the sixth lens has an inflection point, wherein the seventh lens has a positive refractive power and has a convex image-side surface, wherein the eighth lens has a negative refractive power and has an object-side surface and an image-side surface each having at least one inflection point, wherein a center thickness of the seventh lens is greatest among center thicknesses of the first to eighth lenses, wherein one or more lenses among the first to eighth lenses has a refractive index at 587 nm of 1.6 or greater, and seven or less lenses among the first to eighth lenses have a refractive index at 587 nm of less than 1.6, and wherein a refractive index of the second lens is greater than refractive indices of the first and third to eighth lenses, and wherein the optical system satisfies at least one condition of:

1) Abbe numbers of the first, third, fifth, seventh, and eighth lenses are 50 or more, and an Abbe number of the second lens is less than 30, 2) at least two of the third to sixth lenses have positive refractive power and at most two of the third to sixth lenses have negative refractive power, 3) a first interval between the second lens and the third lens along the optical axis is less than a second interval between the sixth lens and the seventh lens along the optical axis and an interval between the seventh lens and the eighth lens along the optical axis is smaller than the first and second intervals and the first and second intervals are 0.4 mm or more, or 4) the center thickness of the seventh lens is in a range of 2 to 4 times the center thickness of each of the fourth, fifth, and sixth lenses, and the seventh lens has a convex object-side surface.

2. The optical system of claim 1, wherein the center thickness of the first lens is thicker than the center thickness of each of the second to sixth lenses and the eighth lens.

3. The optical system of claim 1, wherein a radius of curvature of the object-side surface of the first lens is L1R1, and an absolute value of a radius of curvature of an image-side surface of the first lens is defined as |L1R2|, and wherein the optical system is satisfied: $0<L1R1/|L1R2|<1$.

4. The optical system of claim 1, wherein an absolute value of a radius of curvature of an object-side surface of the second lens is |L2R1| and a radius of curvature of the image-side surface of the second lens is L2R2, and wherein the following relationship is satisfied: $0<L2R2/|L2R1|<1$.

5. The optical system of claim 1, wherein a refractive index of the first lens at 587 nm is G1, a refractive index of the second lens at 587 nm is G2, and refractive indices of the sixth and seventh lenses at 587 nm are G6 and G7, respectively, and wherein the following relationship is satisfied: $0.8<G1/G2<1.2$ and $0.8<G7/G6<1.2$.

6. The optical system of claim 1, wherein when the center thickness of the first, second, sixth, and seventh lenses is T1, T2, T6, and T7, respectively, the following relationship is satisfied: $0.1<T2/T1<0.8$ and $0.1<T6/T7<1$.

7. An optical system comprising:

a first lens, a second lens, a third lens, a fourth lens, a fifth lens, a sixth lens, a seventh lens, and an eighth lens sequentially arranged along an optical axis from an object side to an image side, wherein the first lens has a positive refractive power and has a convex object-side surface, wherein the second lens has a negative refractive power and has a concave image-side surface, wherein at least one of an object-side surface and an image-side surface of the sixth lens has an inflection point, wherein the seventh lens has a positive refractive power and has a convex image-side surface, wherein the eighth lens has a negative refractive power and has an object-side surface and an image-side surface having at least one inflection point, wherein five or more among the first to eighth lenses are lenses having a convex object-side surface, two or more among the first to eighth lenses are lenses having a concave object-side surface, three or more among the first to eighth lenses are lenses having a convex image-side surface, and five or more are lenses having a concave image-side surface, wherein one or more lenses among the first to eighth lenses has a refractive index at 587 nm of 1.6 or greater, and seven or less lenses among the first to eighth lenses have a refractive index at 587 nm of less than 1.6, and wherein a refractive index of the second lens is greater than refractive indices of the first and third to eighth lenses, wherein the optical system satisfies at least one condition of:

1) a number of lenses having an Abbe number of 50 or more is 5 or more, and a number of lenses having an Abbe number of less than 50 is 3 or less, among the first to eighth lenses, or 2) among the first to eighth lenses three or more are lenses having the center thickness of 0.6 mm or more, five or less are lenses having the center thickness of 0.6 mm or less, and the center thickness of the seventh lens is the greatest of all, and the seventh lens has a convex object-side surface.

8. The optical system of claim 7, wherein, the second lens has a refractive index of 1.6 or more at 587 nm, and each of the seventh and eighth lenses has a refractive index of less than 1.6 at 587 nm.

9. The optical system of claim 7, wherein an image side surface of the third lens is concave, wherein the image-side surface of the eighth lens is concave, and wherein the object-side surface of the eighth lens is concave.

10. The optical system of claim 1, wherein an image side surface of the third lens is concave, wherein the image-side surface of the eighth lens is concave, and wherein the object-side surface of the eighth lens is concave.

11. An optical system comprising:

a first lens, a second lens, a third lens, a fourth lens, a fifth lens, a sixth lens, a seventh lens, and an eighth lens sequentially arranged along an optical axis from an object side to an image side, an image sensor on an image side of the eighth lens; and an optical filter between the image sensor and the eighth lens, wherein the first lens has a positive refractive power and has a convex object-side surface, wherein the second lens has a negative refractive power and has a concave image-side surface, wherein at least one of an object-side surface and an image-side surface of the sixth lens has an inflection point, wherein the seventh lens has a positive refractive power and has a convex image-side surface, wherein the eighth lens has a negative refractive power and has an object-side surface and an image-side surface each having at least one inflection point, wherein a center thickness of the seventh lens is greatest among center thicknesses of the first to eighth lenses, wherein one or more lenses among the first to eighth lenses has a refractive index at 587 nm of 1.6 or greater, and seven or less lenses among the first to eighth lenses have a refractive index at 587 nm of less than 1.6, wherein a refractive index of the second lens is greater than refractive indices of the first and third to eighth lenses, and wherein the optical system satisfies at least one condition of:

Equations 1 and 2 being satisfied:

$$0<BFL/TTL<0.3 \quad \text{[Equation 1]}$$

$$0<BFL/Img<0.3 \quad \text{[Equation 1]}$$

where BFL is a distance from an apex of the image-side surface of the eighth lens to the image sensor, TTL is a distance from an apex of the object-side first surface of the first lens to the image sensor, and Img is a vertical distance from the optical axis to 1.0 F, which is a diagonal end on the image sensor, or 2) Equations 3, 4, and 5 being satisfied:

$$0.5<F/TTL<1.2 \quad \text{[Equation 3]}$$

$$0.5<TTL/(Img\times 2)<0.8 \quad \text{[Equation 4]}$$

$$0.5<TTL/(D82\times 2)<1.2 \quad \text{[Equation 5]}$$

where TTL is a distance from an apex of the object-side first surface of the first lens to the image sensor, F is a total effective focal length of the optical system, and Img is a vertical distance from the optical axis to 1.0 F, which is a diagonal end on the image sensor, and D82 is a distance from an apex of the image-side surface of the eighth lens to an effective diameter with respect to the optical axis.

* * * * *